United States Patent
Lin et al.

(10) Patent No.: US 11,323,943 B2
(45) Date of Patent: May 3, 2022

(54) CELL HANDOVER METHOD, METHOD FOR DETERMINING UPLINK TRANSMIT POWER, AND APPARATUS

(71) Applicant: Huawei Technologies Co., Ltd., Guangdong (CN)

(72) Inventors: Bo Lin, Beijing (CN); Xuelong Wang, Shenzhen (CN); Xin Xiong, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 6 days.

(21) Appl. No.: 16/664,451

(22) Filed: Oct. 25, 2019

(65) Prior Publication Data
US 2020/0059847 A1 Feb. 20, 2020

Related U.S. Application Data

(63) Continuation of application No. PCT/CN2018/084058, filed on Apr. 23, 2018.

(30) Foreign Application Priority Data

Apr. 28, 2017 (CN) .......................... 201710296457.5

(51) Int. Cl.
*H04W 36/30* (2009.01)
*H04W 36/00* (2009.01)
(Continued)

(52) U.S. Cl.
CPC .......... *H04W 36/30* (2013.01); *H04W 24/10* (2013.01); *H04W 36/0016* (2013.01); *H04W 36/0058* (2018.08); *H04W 36/08* (2013.01)

(58) Field of Classification Search
CPC . H04W 36/30; H04W 36/0058; H04W 24/10; H04W 36/0016; H04W 36/08;
(Continued)

(56) References Cited

U.S. PATENT DOCUMENTS

2012/0093128 A1 4/2012 Song et al.
2014/0126545 A1* 5/2014 Tamura ............. H04W 36/0079
370/332
(Continued)

FOREIGN PATENT DOCUMENTS

CN 101453745 A 6/2009
CN 101873657 A 10/2010
(Continued)

OTHER PUBLICATIONS

ZTE Corporation, "Email discussion on solution 2 family", 3GPP TSG-RAN WG2 Meeting #94 R2-163863, Nanjing, China, Apr. 11-15, 2016, total 35 pages.
(Continued)

*Primary Examiner* — Golam Sorowar
(74) *Attorney, Agent, or Firm* — Womble Bond Dickinson (US) LLP

(57) ABSTRACT

A method of cell handover, a method for determining an uplink transmit power, and an apparatus are provided, to strengthen control of a network device over a terminal device. The cell handover method includes: receiving, by a terminal device, an early handover command sent by a network device, where the early handover command is used to instruct the terminal device to determine whether to perform a cell handover; measuring, by the terminal device, a downlink signal sent by the network device and/or a downlink signal sent by another network device, and determining, based on an obtained measurement report and a handover condition carried in the early handover command, whether to perform the cell handover; and executing, by the terminal device, a handover command to hand over from a current serving cell to a target cell if the terminal device receives the handover command sent by the network device.

20 Claims, 14 Drawing Sheets

(51) Int. Cl.
*H04W 24/10* (2009.01)
*H04W 36/08* (2009.01)

(58) Field of Classification Search
CPC ........... H04W 36/34; H04W 36/00837; H04W 36/0088; H04W 52/14; H04W 52/146; H04W 74/0833; H04W 36/04; H04W 36/0069; H04W 72/0413; H04W 36/0072; H04W 36/0094; H04W 56/0045; H04W 76/15; H04W 16/32; H04W 36/0077; H04W 48/16; H04W 76/28; H04W 36/38; H04W 72/0446; H04L 5/001; H04L 5/0098; H04L 1/1812; H04L 5/0048; H04L 5/0035; H04L 5/0053; H04L 5/0007; H04L 5/00; H04L 5/0094; H04L 5/0073; H04L 5/0055; H04L 69/323; H04L 69/324; H04L 1/1896; H04L 5/0037; H04L 5/0096; H04L 1/1864; H04L 41/0816; H04L 41/0843; H04L 41/12

See application file for complete search history.

(56) References Cited

U.S. PATENT DOCUMENTS

| | | | |
|---|---|---|---|
| 2015/0045040 A1 | 2/2015 | Lai et al. | |
| 2015/0319650 A1* | 11/2015 | Wang | H04W 74/004 370/331 |
| 2015/0341834 A1* | 11/2015 | Lee | H04L 5/1438 370/252 |
| 2016/0014666 A1 | 1/2016 | Müller et al. | |
| 2016/0192270 A1 | 6/2016 | Xu et al. | |
| 2016/0198385 A1* | 7/2016 | Braun | H04W 36/0094 455/437 |

FOREIGN PATENT DOCUMENTS

| | | |
|---|---|---|
| CN | 101932052 A | 12/2010 |
| CN | 104202758 A | 12/2014 |
| CN | 105101247 A | 11/2015 |
| CN | 106454876 A | 2/2017 |
| CN | 106454961 A | 2/2017 |
| EP | 3738348 A1 | 11/2020 |
| WO | 2015032188 A1 | 3/2015 |
| WO | 2019134163 A1 | 7/2019 |

OTHER PUBLICATIONS

Ericsson:"Robust handover via early handover command", 3GPP TSG-RAN WG2 #95bis, R2-166928, Kaohsiung, Taiwan, Oct. 10-14, 2016. total 4 pages.

Huawei, HiSilicon,"UL based mobility in RRC_ACTIVE",3GPP TSG-RAN WG2 Meeting #96, R2-168561, Reno, United States of America, Nov. 14-18, 2016,total 5 pages.

Ericsson: "Conditional Handover", 3GPP Draft; R2-1700864,Feb. 12, 2017 (Feb. 12, 2017),XP051211645,total 5 pages.

Intel Corporation: "Analysis of conditional handover", 3GPP Draft; R2-1703415,Apr. 3, 2017 (Apr. 3, 2017), XP051245271,total 4 pages.

Sony: "Early Handover solutions (Update of R2-1700142)",3GPP Draft; R2-1701506,Feb. 12, 2017 (Feb. 12, 2017),XP051212136,total 3 pages.

* cited by examiner

CELL HANDOVER METHOD, METHOD FOR DETERMINING UPLINK TRANSMIT POWER, AND APPARATUS

CROSS-REFERENCE TO RELATED APPLICATIONS

This application is a continuation of International Application No. PCT/CN2018/084058, filed on Apr. 23, 2018, which claims priority to Chinese Patent Application No. 201710296457.5, filed on Apr. 28, 2017, the disclosures of which are incorporated herein by reference in their entireties.

TECHNICAL FIELD

Embodiments of the present disclosure relate to the field of communications technologies, and in particular, to a cell handover method, a method for determining an uplink transmit power, and an apparatus.

BACKGROUND

In a wireless communications system, a mobility technology is a key technology. For a terminal device in a connected state, the terminal device may move between different base stations through a cell handover process.

Currently, a manner for performing cell handover by a terminal device is provided in a long term evolution (LTE) system. In such a manner, a source cell instructs the terminal device to measure the source cell and a target cell of the terminal device. After the measurement, the terminal device autonomously determines, based on an obtained measurement report, whether to perform cell handover.

As can be learned, in such a handover manner, the terminal device autonomously determines whether to perform cell handover, and a disadvantage of such a handover manner is that a network side loses control over the terminal device. In addition, in a process in which the terminal device hands over between two base stations, the base stations need to cooperate with each other. For example, a target base station usually reserves a resource for the terminal device that is to perform a handover. Therefore, if the target base station reserves the resource, but the terminal device never initiates the handover, a waste of resources is caused.

SUMMARY

Embodiments of the present disclosure provide a cell handover method, a method for determining an uplink transmit power, and an apparatus, to strengthen control of a network device over a terminal device.

According to a first aspect, a cell handover method is provided. The method may be performed by a terminal device. The method includes: receiving, by the terminal device, an early handover command sent by a network device, where the early handover command is used to instruct the terminal device to determine whether to perform cell handover; measuring, by the terminal device, a downlink signal sent by the network device and/or a downlink signal sent by another network device, and determining, based on an obtained measurement report and a handover condition that is carried in the early handover command, whether to perform cell handover; and executing, by the terminal device, a handover command if the terminal device receives the handover command sent by the network device, to hand over from a current serving cell to a target cell.

In this embodiment, the terminal device can also perform measurement based on the downlink signal sent by the network device and/or the downlink signal sent by the another network device. In other words, the terminal device can still measure a source cell and the target cell. However, the network device can still send the handover command to the terminal device. If the terminal device receives the handover command sent by the network device, the terminal device performs cell handover by executing the handover command. As can be learned, the network device can control the terminal device, and does not lose control over the terminal device even if the terminal device completely determines whether to perform handover. In addition, if a target base station reserves a resource for the terminal device that is to perform handover, the network device may determine, after comprehensively considering various factors, whether to send the handover command to the terminal device, so that the terminal device can perform cell handover, thereby avoiding a waste of resources.

In one embodiment, the terminal device determines, based on the obtained measurement report and the handover condition if the terminal device does not receive the handover command sent by the network device, whether to perform cell handover.

If the terminal device does not receive the handover command sent by the network device, the terminal device can continue determining whether to perform cell handover, to ensure that the terminal device can complete cell handover as soon as possible, thereby reducing a handover delay.

In one embodiment, before the executing, by the terminal device, a handover command if the terminal device receives the handover command sent by the network device, to hand over from a current serving cell to a target cell, the terminal device determines, based on the obtained measurement report and the handover condition, to perform cell handover.

It may be understood that in this embodiment, a process in which the network device determines whether the terminal device performs cell handover and a process in which the terminal device determines whether the terminal device performs cell handover are both in progress. If either party of the network device and the terminal device determines that the terminal device performs handover, the terminal device executes the determining of the party to perform cell handover. Efficiency of performing cell handover by the terminal device is improved in this manner.

In one embodiment, the terminal device sends, to the network device, the measurement report obtained by measuring the downlink signal sent by the network device and/or the downlink signal sent by the another network device, where the measurement report is used by the network device to determine whether the terminal device needs to perform cell handover.

After obtaining the measurement report, in addition to determining whether the terminal device performs cell handover, the terminal device may further send the measurement report to the network device, and the network device may also determine, based on the measurement report sent by the terminal device, whether the terminal device performs cell handover. In this way, the network device does not need to perform measurement by itself, thereby reducing workload of the network device.

In one embodiment, the terminal device receives uplink configuration information sent by the network device. The terminal device sends an uplink reference signal to the network device based on the uplink configuration information, where the uplink reference signal is used by the network device to determine whether the terminal device needs to perform cell handover.

Alternatively, the network device may determine, based on the measurement report obtained by the network device, whether the terminal device performs cell handover. Therefore, the network device may send the uplink configuration information to the terminal device, to configure the terminal device to send the uplink reference signal to the network device. The network device may measure the uplink reference signal after receiving the uplink reference signal sent by the terminal device, to determine, based on the obtained measurement report, whether the terminal device performs cell handover. The network device obtains the measurement report by itself, so that a determining result of the network device is more accurate and timely.

In one embodiment, the terminal device receives a handover cancel command sent by the network device, where the handover cancel command is used to cancel a function that is configured by the early handover command for the terminal device to determine whether the terminal device performs cell handover. The terminal device executes the handover cancel command, to cancel determining whether the terminal device performs cell handover.

The network device may configure that the terminal device performs conditional handover, or may configure that the terminal device cancels conditional handover. For example, if the network device finds, by monitoring, that channel quality and the like of the terminal device are gradually becoming better, the network device may configure that the terminal device cancels conditional handover, and continue providing a service for the terminal device. In this way, a quantity of times of performing cell handover by the terminal device can be reduced, thereby ensuring service continuity.

In one embodiment, the target cell is determined by the terminal device by measuring the downlink signal sent by the network device and/or the downlink signal sent by the another network device, or the target cell is indicated by the handover command.

When the terminal device performs cell handover, the target cell may be selected by the terminal device based on the measurement report obtained by the terminal device, or may be selected based on the handover command sent by the network device. In other words, the target cell may be determined by the terminal device, or may be determined by the network device. The manners are relatively flexible.

According to a second aspect, a cell handover method is provided. The method may be performed by a network device, and the network device may be, for example, a base station. The method includes: sending, by the network device, an early handover command to a terminal device, where the early handover command is used to instruct the terminal device to determine whether to perform cell handover; determining, by the network device, whether the terminal device needs to perform cell handover; and sending, by the network device, a handover command to the terminal device if the network device determines that the terminal device needs to perform cell handover, where the handover command is used to instruct the terminal device to perform cell handover.

In one embodiment, the network device sends uplink configuration information to the terminal device, where the uplink configuration information is used by the terminal device to send an uplink reference signal to the network device. The network device receives the uplink reference signal sent by the terminal device. The network device measures the uplink reference signal, to obtain a measurement report. The determining, by the network device, whether the terminal device needs to perform cell handover includes: determining, by the network device based on the obtained measurement report, whether the terminal device needs to perform cell handover.

The network device may determine, based on different determining bases, whether the terminal device needs to perform cell handover, and the measurement report that is obtained by the network device by performing measurement and based on which the network device performs determining is one of the determining bases. In such a determining manner, the network device performs determining based on the measurement report obtained by the network device by performing measurement, so that a determining result of the network device is more accurate and timely.

In one embodiment, the network device receives a measurement report sent by the terminal device, where the measurement report is obtained by the terminal device by measuring a downlink signal sent by the network device and/or a downlink signal sent by another network device. The determining, by the network device, whether the terminal device needs to perform cell handover includes: determining, by the network device based on the received measurement report, whether the terminal device needs to perform cell handover.

The foregoing illustrates that the network device may determine, based on different determining bases, whether the terminal device needs to perform cell handover, and the measurement report that is sent by the terminal device and based on which the network device performs determining is another determining basis. In such a determining manner, the network device performs determining based on the measurement report sent by the terminal device, and the network device does not need to perform measurement, thereby reducing workload of the network device.

In one embodiment, the determining, by the network device, whether the terminal device needs to perform cell handover includes: if a timer that is set in the network device expires, determining, by the network device, that the terminal device needs to perform cell handover.

Whether the timer expires is another determining basis on which the network device determines whether the terminal device needs to perform cell handover. Such a manner is relatively simple. It may be determined, provided that the timer expires, that the terminal device needs to perform cell handover, and no extra work needs to be done, thereby reducing a burden of the network device.

In one embodiment, the network device sends a handover cancel command to the terminal device, where the handover cancel command is used to instruct the terminal device to stop determining whether to perform cell handover.

In one embodiment, the handover command carries a cell identifier, where the cell identifier is an identifier of a cell to which the terminal device can hand over.

The handover command sent by the network device to the terminal device may carry the cell identifier, and the terminal device may select a target cell based on the cell identifier sent by the network device, so that the terminal device can work under control of the network device, thereby strengthening control of the network device.

According to a third aspect, a cell handover method is provided. The method may be performed by a terminal device. The method includes: receiving, by the terminal device, an early handover command sent by a network device, where the early handover command is used to instruct the terminal device to determine whether to perform cell handover, the early handover command carries a cell identifier, the cell identifier is determined by the network device by measuring an uplink signal sent by the terminal device, and the cell identifier is an identifier of a cell to which the terminal device can hand over. The terminal device measures a downlink signal sent by the network device and/or a downlink signal sent by another network device, and determines, based on an obtained measurement report and a handover condition that is carried in the early handover command, whether to perform cell handover. The terminal device hands over from a current serving cell to a target cell, where the target cell is determined by the terminal device based on the obtained measurement report and/or the received cell identifier.

In this embodiment, the terminal device may perform conditional handover, and the network device may measure an uplink reference signal sent by the terminal device, to determine the cell identifier. The terminal device may select a best cell, as the target cell, from cells whose cell identifiers are sent by the network device and/or cells whose cell identifiers are determined by the terminal device, so that a selection range of the target cell is wider, and it is more helpful to select a cell having better performance.

In one embodiment, if the target cell is determined by the terminal device based on the received cell identifier, before the terminal device hands over from the current serving cell to the target cell, the terminal device receives a handover command sent by the network device, where the handover command is used to instruct the terminal device to perform cell handover.

The network device may determine whether the terminal device needs to perform cell handover. If the network device determines that the terminal device needs to perform cell handover, the network device may directly send the handover command to the terminal device, and the terminal device may directly execute the handover command sent by the network device, to perform cell handover. Moreover, the terminal device may select the target cell from the cells whose cell identifiers are sent by the network device, thereby strengthening control of the network device, and reducing a handover delay.

According to a fourth aspect, a cell handover method is provided. The method may be performed by a network device, and the network device may be, for example, a base station. The method includes: receiving, by the network device, an uplink reference signal sent by a terminal device; measuring, by the network device, the uplink reference signal, to obtain a measurement report; determining, by the network device, a cell identifier based on the measurement report, where the cell identifier is an identifier of a cell to which the terminal device can hand over; and sending, by the network device, an early handover command to the terminal device, where the early handover command is used to instruct the terminal device to determine whether to perform cell handover, and the early handover command carries the cell identifier.

The network device may measure the uplink reference signal sent by the terminal device, to determine the cell identifier. The terminal device may select a best cell, as a target cell, from cells whose cell identifiers are sent by the network device and/or cells whose cell identifiers are determined by the terminal device, so that a selection range of the target cell is wider, and it is more helpful to select a cell having better performance.

In one embodiment, the network device sends a handover command to the terminal device, where the handover command is used to instruct the terminal device to perform cell handover.

According to a fifth aspect, a method for determining an uplink transmit power is provided. The method may be performed by a network device, and the network device is a target network device, that is, a network device to which a terminal device hands over. The target network device may be, for example, a base station. The method includes: before the terminal device hands over to the target network device, determining, by the target network device, an uplink transmit power of the terminal device; and sending, by the target network device, reference information to a source network device currently accessed by the terminal device, where the reference information is used to indicate the uplink transmit power of the terminal device.

In this embodiment, a target cell may determine an uplink transmit power of the terminal device after the handover, so that the determined uplink transmit power is more accurate.

In one embodiment, the reference information includes an offset and/or an uplink path loss. The offset is an offset based on an initial transmit power of the terminal device, and the uplink path loss is a path loss between the terminal device and the target network device.

By using the offset and/or the uplink path loss, the terminal device can obtain the uplink transmit power after the handover.

In one embodiment, the determining, by the target network device, an uplink transmit power of the terminal device includes: receiving, by the target network device, an uplink reference signal sent by the terminal device, and determining, by the target network device, the uplink transmit power based on a transmit power for the uplink reference signal.

The target network device may directly receive the uplink reference signal sent by the terminal device, or may obtain, from the source network device, the uplink reference signal sent by the terminal device. This is not limited in this embodiment.

In one embodiment, after the terminal device hands over to the target network device, the target network device receives a message sent by the terminal device at the uplink transmit power.

The terminal device has determined the uplink transmit power after the handover. After handing over to the target network device, the terminal device may send a message to the target network device at the determined uplink transmit power, thereby improving a success rate of message sending.

According to a sixth aspect, a method for determining an uplink transmit power is provided. The method may be performed by a terminal device. The method includes: before handing over to a target network device, receiving, by the terminal device, reference information sent by a source network device, where the reference information is used to indicate an uplink transmit power at which the terminal device sends a message to the target network device; and determining, by the terminal device based on the reference information, the uplink transmit power at which the terminal device sends a message to the target network device.

In one embodiment, the reference information includes an offset and/or an uplink path loss. The offset is an offset based on an initial transmit power of the terminal device, and the uplink path loss is a path loss between the terminal device and the target network device.

In one embodiment, after handing over to the target network device, the terminal device sends a message to the target network device at the uplink transmit power.

According to a seventh aspect, a cell handover method is provided. The method may be performed by a terminal device. The method includes: receiving, by the terminal device, an early handover command sent by a network device, where the early handover command is used to instruct the terminal device to determine whether to perform cell handover; and if a reporting condition of a measurement report is met before a handover condition carried in the early handover command, sending, by the terminal device, the measurement report to the network device, where the measurement report is obtained by the terminal device by measuring a downlink signal sent by the network device and/or a downlink signal sent by another network device.

In this way, the network device and/or the terminal device may determine in time whether the terminal device performs cell handover, so that the terminal device may perform cell handover as soon as possible.

In one embodiment, if the handover condition carried in the early handover command is met before the reporting condition of the measurement report, or the handover condition carried in the early handover command and the reporting condition of the measurement report are simultaneously met, the terminal device hands over from a current serving cell to a target cell.

That is, the terminal device preferentially performs cell handover. The terminal device performs cell handover provided that the terminal device or the network device determines that the terminal device can perform cell handover, thereby reducing a handover delay.

According to an eighth aspect, a communications apparatus is provided. The communications apparatus has functions for implementing the terminal device in the foregoing method design. These functions may be implemented by hardware, or may be implemented by hardware executing corresponding software. The hardware or the software includes one or more units corresponding to the functions.

In one embodiment, a specific structure of the communications apparatus may include a receiving unit and a processing unit. In another embodiment, the specific structure of the communications apparatus may further include a sending unit. The receiving unit, the processing unit, and the sending unit may perform corresponding functions in the method according to the first aspect or any embodiment of the first aspect.

According to a ninth aspect, a communications apparatus is provided. The communications apparatus has functions for implementing the network device in the foregoing method design. These functions may be implemented by hardware, or may be implemented by hardware executing corresponding software. The hardware or the software includes one or more units corresponding to the functions.

In one embodiment, a specific structure of the communications apparatus may include a sending unit and a processing unit. In another embodiment, the specific structure of the communications apparatus may further include a receiving unit. The receiving unit, the sending unit, and the processing unit may perform corresponding functions in the method according to the second aspect or any embodiment of the second aspect.

According to a tenth aspect, a communications apparatus is provided. The communications apparatus has functions for implementing the terminal device in the foregoing method design. These functions may be implemented by hardware, or may be implemented by hardware executing corresponding software. The hardware or the software includes one or more units corresponding to the functions.

In one embodiment, a specific structure of the communications apparatus may include a receiving unit and a processing unit. The receiving unit and the processing unit may perform corresponding functions in the method according to the third aspect or any embodiment of the third aspect.

According to an eleventh aspect, a communications apparatus is provided. The communications apparatus has functions for implementing the network device in the foregoing method design. These functions may be implemented by hardware, or may be implemented by hardware executing corresponding software. The hardware or the software includes one or more units corresponding to the functions.

In one embodiment, a specific structure of the communications apparatus may include a receiving unit, a processing unit, and a sending unit. The receiving unit, the processing unit, and the sending unit may perform corresponding functions in the method according to the fourth aspect or any embodiment of the fourth aspect.

According to a twelfth aspect, a communications apparatus is provided. The communications apparatus has functions for implementing the network device in the foregoing method design. These functions may be implemented by hardware, or may be implemented by hardware executing corresponding software. The hardware or the software includes one or more units corresponding to the functions.

In one embodiment, a specific structure of the communications apparatus may include a sending unit and a processing unit. In another embodiment, the specific structure of the communications apparatus may include a receiving unit. The receiving unit, the processing unit, and the sending unit may perform corresponding functions in the method according to the fifth aspect or any embodiment of the fifth aspect.

According to a thirteenth aspect, a communications apparatus is provided. The communications apparatus has functions for implementing the terminal device in the foregoing method design. These functions may be implemented by hardware, or may be implemented by hardware executing corresponding software. The hardware or the software includes one or more units corresponding to the functions.

In one embodiment, a specific structure of the communications apparatus may include a receiving unit and a processing unit. In another embodiment, the specific structure of the communications apparatus may include a sending unit. The receiving unit, the processing unit, and the sending unit may perform corresponding functions in the method according to the sixth aspect or any embodiment of the sixth aspect.

According to a fourteenth aspect, a communications apparatus is provided. The communications apparatus has functions for implementing the terminal device in the foregoing method design. These functions may be implemented by hardware, or may be implemented by hardware executing corresponding software. The hardware or the software includes one or more units corresponding to the functions.

In one embodiment, a specific structure of the communications apparatus may include a receiving unit and a sending unit. In another embodiment, the specific structure of the communications apparatus may include a processing unit. The receiving unit, the processing unit, and the sending unit may perform corresponding functions in the method according to the seventh aspect or any embodiment of the seventh aspect.

According to a fifteenth aspect, a communications apparatus is provided. The communications apparatus may be a terminal device, or may be a functional module such as a chip disposed in a terminal device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the terminal device according to the first aspect or any embodiment of the first aspect.

According to a sixteenth aspect, a communications apparatus is provided. The communications apparatus may be a network device, or may be a functional module such as a chip disposed in a network device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the network device according to the second aspect or any embodiment of the second aspect.

According to a seventeenth aspect, a communications apparatus is provided. The communications apparatus may be a terminal device, or may be a functional module such as a chip disposed in a terminal device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the terminal device according to the third aspect or any embodiment of the third aspect.

According to an eighteenth aspect, a communications apparatus is provided. The communications apparatus may be a network device, or may be a functional module such as a chip disposed in a network device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the network device according to the fourth aspect or any embodiment of the fourth aspect.

According to a nineteenth aspect, a communications apparatus is provided. The communications apparatus may be a network device, or may be a functional module such as a chip disposed in a network device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the target network device according to the fifth aspect or any embodiment of the fifth aspect.

According to a twentieth aspect, a communications apparatus is provided. The communications apparatus may be a terminal device, or may be a functional module such as a chip disposed in a terminal device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the terminal device according to the sixth aspect or any embodiment of the sixth aspect.

According to a twenty-first aspect, a communications apparatus is provided. The communications apparatus may be a terminal device, or may be a functional module such as a chip disposed in a terminal device. The communications apparatus includes: a memory configured to store computer-executable program code, a communications interface, and a processor. The processor is coupled to the memory and the communications interface. The program code stored in the memory includes an instruction. When the processor executes the instruction, the instruction enables the communications apparatus to perform the method performed by the terminal device according to the seventh aspect or any embodiment of the seventh aspect.

According to a twenty-second aspect, a computer storage medium is provided, configured to store computer software instructions used by the communications apparatus described in the eighth aspect or the communications apparatus described in the fifteenth aspect. The computer software instructions include a program designed for the terminal device according to the first aspect or any embodiment of the first aspect.

According to a twenty-third aspect, a computer storage medium is provided, configured to store computer software instructions used by the communications apparatus described in the ninth aspect or the communications apparatus described in the sixteenth aspect. The computer software instructions include a program designed for the network device according to the second aspect or any embodiment of the second aspect.

According to a twenty-fourth aspect, a computer storage medium is provided, configured to store computer software instructions used by the communications apparatus described in the tenth aspect or the communications apparatus described in the seventeenth aspect. The computer software instructions include a program designed for the terminal device according to the third aspect or any embodiment of the third aspect.

According to a twenty-fifth aspect, a computer storage medium is provided, configured to store computer software instructions used by the communications apparatus described in the eleventh aspect or the communications apparatus described in the eighteenth aspect. The computer software instructions include a program designed for the network device according to the fourth aspect or any embodiment of the fourth aspect.

According to a twenty-sixth aspect, a computer storage medium is provided, configured to store computer software instructions used by the communications apparatus described in the twelfth aspect or the communications apparatus described in the nineteenth aspect. The computer software instructions include a program designed for the network device according to the fifth aspect or any embodiment of the fifth aspect.

According to a twenty-seventh aspect, a computer storage medium is provided, configured to store computer software instructions used by the communications apparatus described in the thirteenth aspect or the communications apparatus described in the twentieth aspect. The computer software instructions include a program designed for the terminal device according to the sixth aspect or any embodiment of the sixth aspect.

According to a twenty-eighth aspect, a computer storage medium is provided, configured to store computer software instructions used by the communications apparatus described in the fourteenth aspect or the communications apparatus described in the twenty-first aspect. The computer software instructions include a program designed for the terminal device according to the seventh aspect or any embodiment of the seventh aspect.

According to a twenty-ninth aspect, a computer program product including an instruction is provided. When the computer program product is run on a computer, the computer is enabled to perform the method according to the first aspect or any embodiment of the first aspect.

According to a thirtieth aspect, a computer program product including an instruction is provided. When the computer program product is run on a computer, the computer is enabled to perform the method according to the second aspect or any embodiment of the second aspect.

According to a thirty-first aspect, a computer program product including an instruction is provided. When the computer program product is run on a computer, the computer is enabled to perform the method according to the third aspect or any embodiment of the third aspect.

According to a thirty-second aspect, a computer program product including an instruction is provided. When the computer program product is run on a computer, the computer is enabled to perform the method according to the fourth aspect or any embodiment of the fourth aspect.

According to a thirty-third aspect, a computer program product including an instruction is provided. When the computer program product is run on a computer, the computer is enabled to perform the method according to the fifth aspect or any embodiment of the fifth aspect.

According to a thirty-fourth aspect, a computer program product including an instruction is provided. When the computer program product is run on a computer, the computer is enabled to perform the method according to the sixth aspect or any embodiment of the sixth aspect.

According to a thirty-fifth aspect, a computer program product including an instruction is provided. When the computer program product is run on a computer, the computer is enabled to perform the method according to the seventh aspect or any embodiment of the seventh aspect.

In the embodiments described herein, the network device can control the terminal device, and does not lose control over the terminal device even if the terminal device completely determines whether to perform handover.

DESCRIPTION OF EMBODIMENTS

Figure 1:
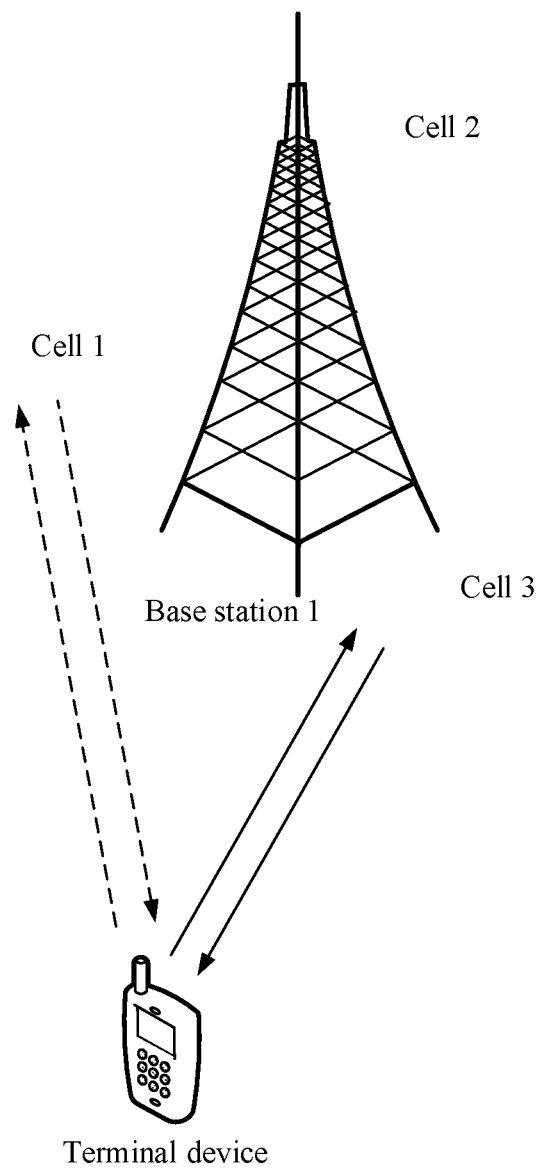
FIG. 1 and FIG. 2 are schematic diagrams of two application scenarios according to one embodiment.

The following further describes embodiments of the present disclosure in detail with reference to the accompanying drawings.

Technical solutions described in this specification may be applied to an LTE system or a fifth generation (5G) mobile communications technology system, or may be applied to a next-generation mobile communications system.

The following describes some terms in the embodiments of the present disclosure, to help a person skilled in the art have a better understanding.

(1) A network device, for example, including a base station (for example, an access point), may be a device that communicates in an access network with a wireless terminal device by using one or more cells over an air interface. The base station may be configured to mutually convert a received over-the-air frame and an Internet protocol (IP) packet and serve as a router between the terminal device and a rest portion of the access network, where the rest portion of the access network may include an IP network. The base station may coordinate attribute management of the air interface. For example, the base station may include an evolved NodeB (eNB, or e-NodeB) in an LTE system or an LTE-advanced (LTE-A) system, or may include a next generation Node B (gNB) in a 5G system. This is not limited in the embodiments of this application.

(2) A terminal device includes a device that provides a user with voice and/or data connectivity, for example, may include a handheld device with a wireless connection function, or a processing device connected to a wireless modem. The terminal device may communicate with a core network by using a radio access network (RAN), and exchange voice and/or data with the RAN. The terminal device may be user equipment (UE), a wireless terminal device, a mobile terminal device, a subscriber unit, a subscriber station, a mobile station, a mobile station, a remote station, an access point (AP), a remote terminal device, an access terminal device, a user terminal device, a user agent, a user device, or the like. For example, the terminal device may be a mobile phone (or referred to as a "cellular" phone), a computer with a mobile terminal device, a portable, pocket-sized, handheld, computer-embedded or vehicle-mounted mobile apparatus, an intelligent wearable device, or the like. For example, the terminal device may be a device such as a personal communication service (PCS) phone, a cordless telephone set, a session initiation protocol (SIP) phone, a wireless local loop (WLL) station, a personal digital assistant (PDA), a smartwatch, a smart helmet, smart glasses, or a smart band. The terminal device may further be a limited device, for example, a device with relatively low power consumption, a device with a limited storage capability, or a device with a limited computing capability. For example, the terminal device is an information sensing device such as a barcode, radio frequency identification (RFID), a sensor, a global positioning system (GPS), or a laser scanner.

(3) The terms "system" and "network" may be used interchangeably in the embodiments of the present disclosure. The term "a plurality of" means two or more. In view of this, the term "a plurality of" may also be understood as "at least two" in the embodiments of the present disclosure. The term "and/or" describes an association relationship between associated objects and represents that three relationships may exist. For example, A and/or B may represent the following three cases: Only A exists, both A and B exist, and only B exists. In addition, unless otherwise specified, the character "/" usually indicates an "or" relationship between the associated objects.

To better understand the technical solutions in the embodiments of the present disclosure, the following first describes an application scenario of the embodiments of the present disclosure.

FIG. 1 shows an application scenario according to one embodiment. FIG. 1 includes a terminal device and a base station. The base station is provided with three cells, which are a cell 1, a cell 2, and a cell 3. The cell 3 is a current serving cell of the terminal device. If the terminal device performs cell handover, the terminal device may hand over to the cell 1 or the cell 2.

Figure 2:
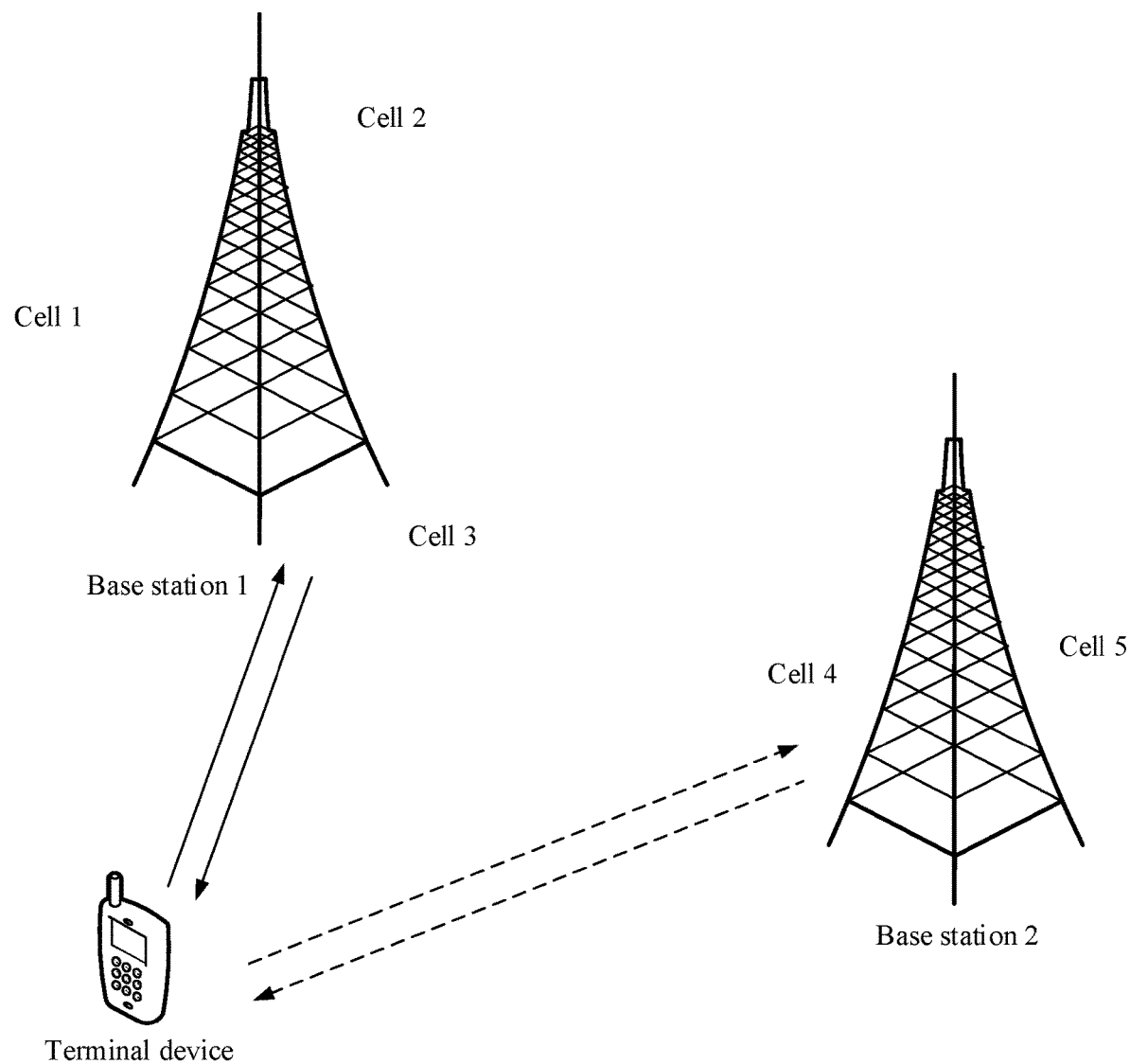

In the application scenario shown in FIG. 1, intra-base station handover is used as an example, to be specific, a source cell before handover and a target cell after the handover belong to a same base station. In this embodiment, the source cell before the handover and the target cell after the handover may alternatively belong to different base stations. FIG. 2 shows another application scenario according to one embodiment. FIG. 2 includes a terminal device, a base station 1, and a base station 2. The base station 1 is provided with three cells, which are a cell 1, a cell 2, and a cell 3. The base station 2 is provided with two cells, which are a cell 4 and a cell 5. The cell 3 is a current serving cell of the terminal device. If the terminal device performs cell handover, the terminal device may hand over to the cell 1 or the cell 2, that is, perform intra-base station handover, or may hand over to the cell 4 or the cell 5, that is, perform inter-base station handover.

Figure 3:
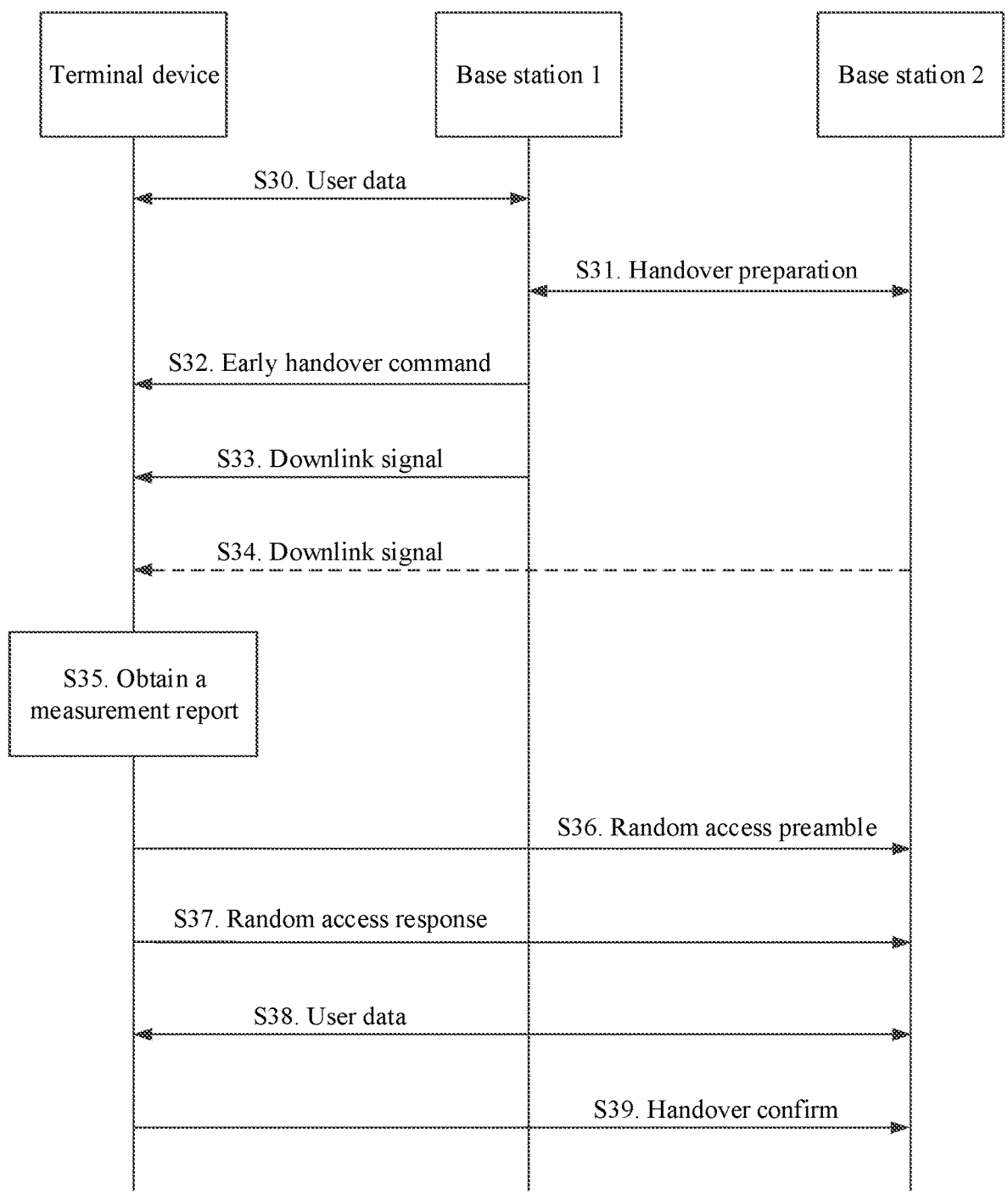
FIG. 3 is a flowchart of conditional handover according to one embodiment.

The following first describes a cell handover method by using an embodiment. Such a handover method may be referred to as "conditional handover". In such a handover method, the terminal device determines whether to perform cell handover. Such a determining manner for the terminal device is referred to as "conditional determining". FIG. 3 is a flowchart of a conditional handover method. In the following description process, an example in which this embodiment is applied to the scenario shown in FIG. 2 is used. A cell 1, a cell 2, or a cell 3 provided by a base station 1 is a serving cell of a terminal device before handover, and a cell 4 or a cell 5 provided by a base station 2 is a cell to which the terminal device can hand over.

S30. The terminal device exchanges some user data with the base station 1. That is, the terminal device exchanges user data with the serving cell provided by the base station 1.

The base station 1 may perform handover determining based on the user data. The handover determining herein is different from determining whether the terminal device performs cell handover described in the following portion of this specification. Instead, the handover determining may be understood as determining whether to send an early handover (HO) command to the terminal device.

S31. The base station 1 and the base station 2 perform configuration and prepare for handover (HO).

For example, the base station 1 and the base station 2 perform active mode reference signal resource pre-configuration and handover preparation. The base station 2 may notify the base station 1 of configuration information for handover of the terminal device. In addition, the base station 2 may further reserve a resource for the terminal device.

S32. The base station 1 sends the early handover command to the terminal device through the serving cell, and the terminal device receives the early handover command.

The early handover command is used to instruct the terminal device to determine whether to perform cell handover. In other words, the terminal device knows, based on the early handover command, that the terminal device needs to determine whether to perform conditional handover.

S33. The base station 1 sends a downlink signal beam in an active mode to the terminal device, and the terminal device receives the reference signal beam. It may be understood that the base station 1 sends a downlink signal to the terminal device. The downlink signal sent by the base station 1 is, for example, a downlink reference signal.

S34. The base station 2 sends a downlink signal beam in an active mode to the terminal device, and the terminal device receives the reference signal beam. It may be understood that the base station 2 sends a downlink signal to the terminal device. The downlink signal sent by the base station 2 is, for example, a downlink reference signal.

S33 may be performed before S34, or S33 is performed after S34, or S33 and S34 are simultaneously performed.

In addition, the base station 2 may send a downlink signal to the terminal device, or may not send a downlink signal to the terminal device. Therefore, the arrow used to represent S34 in FIG. 3 is a dashed arrow.

S35. The terminal device obtains a measurement report of the reference signal in the active mode.

After receiving the downlink reference signal sent by the base station 1, the terminal device measures the downlink reference signal sent by the base station 1, to obtain a measurement report. Similarly, after receiving the downlink reference signal sent by the base station 2, the terminal device also measures the downlink reference signal sent by the base station 2, to obtain a measurement report. In this way, the terminal device obtains the measurement report of the reference signal in the active mode.

S36. The terminal device sends a random access preamble to the base station 2, to request to access the base station 2. The base station 2 receives the random access preamble.

After obtaining the measurement report, the terminal device determines, based on the measurement report and a handover condition, whether to perform cell handover. If the terminal device determines to perform cell handover, the terminal device performs S36.

S37. If the base station 2 agrees with the access of the terminal device, the base station 2 sends a random access response to the terminal device, and the terminal device receives the random access response.

S38. The terminal device exchanges some user data with the base station 2. That is, the terminal device exchanges user data with the new serving cell provided by the accessed base station 2.

S39. The terminal device sends a handover confirm to the base station 2, and the base station 2 receives the handover confirm.

In the embodiment shown in FIG. 3, the terminal device autonomously determines whether to perform cell handover, and a disadvantage of such a handover manner is that a network side loses control over the terminal device. In the description of this embodiment, an example in which the terminal device determines whether to perform handover is used. However, if the terminal device determines not to perform handover, and the base station 2 reserves a resource for the terminal device, a waste of resources may be caused.

In view of this, an embodiment of the present disclosure provides a cell handover method. In the method, the terminal device can also perform measurement based on a downlink signal sent by the network device and/or a downlink signal sent by another network device. In other words, the terminal device can still measure a source cell and a target cell. However, the network device may still send a handover command to the terminal device. If the terminal device receives the handover command sent by the network device, the terminal device performs cell handover by executing the handover command. As can be learned, the network device can control the terminal device, and does not lose control over the terminal device even if the terminal device completely determines whether to perform handover. In addition, if a target base station reserves a resource for the terminal device that is to perform handover, the network device may determine, after comprehensively considering various factors, whether to send the handover command to the terminal device, so that the terminal device can perform cell handover, thereby avoiding a waste of resources.

A technical solution provided in this embodiment is described below with reference to the accompanying drawings.

Figure 4:
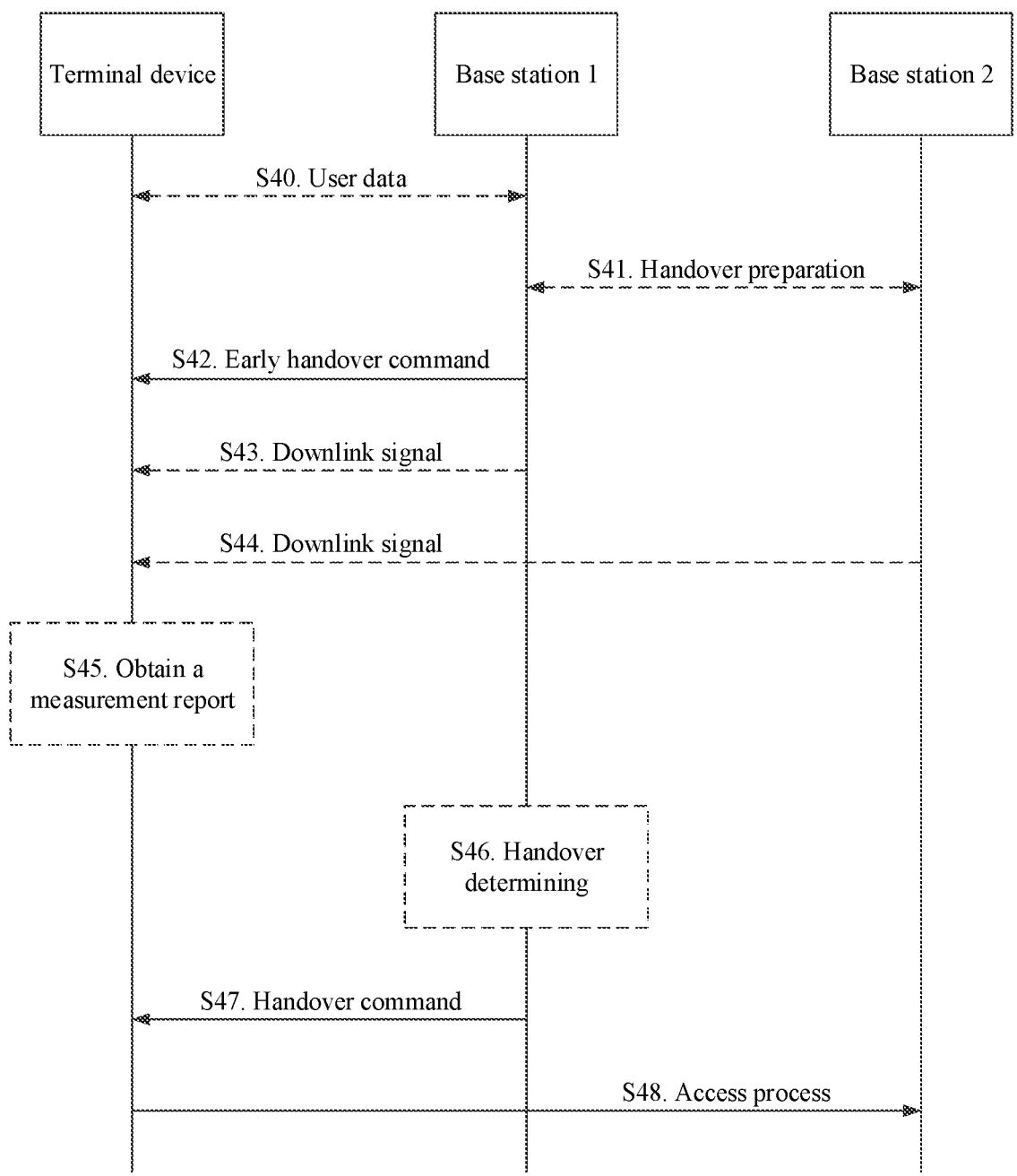
FIG. 4 is a flowchart of a cell handover method according to one embodiment.

An embodiment of the present disclosure provides a cell handover method. FIG. 4 is a flowchart of the method. In the following description process, an example in which the method is applied to the application scenario shown in FIG. 1 or the application scenario shown in FIG. 2 is used, and an example in which a cell 1, a cell 2, or a cell 3 provided by a base station 1 is a serving cell of a terminal device before handover is used.

For S40 in the embodiment shown in FIG. 4, refer to S30 in the embodiment shown in FIG. 3. For S41 in the embodiment shown in FIG. 4, refer to S31 in the embodiment shown in FIG. 3. Details are not described herein again. It should be noted that because S40 and S41 are not mandatory steps, to distinguish S40 and S41 from a mandatory step, the arrows used to represent the two steps in FIG. 4 are dashed arrows.

S42. The base station 1 sends an early handover command to the terminal device through the serving cell, and the terminal device receives the early handover command.

The early handover command is used to instruct the terminal device to determine whether to perform cell handover. In other words, the terminal device knows, based on the early handover command, that the terminal device needs to determine whether to perform conditional handover.

The early handover command may further carry a handover condition of the conditional handover, and the terminal device may perform determining based on the handover condition.

In one embodiment, after sending the early handover command to the terminal device, the base station 1 may further send a handover cancel command to the terminal device, and the terminal device receives the handover cancel command. The step of sending the handover cancel command by the base station 1 to the terminal device may be performed at any moment after S42. The handover cancel command may be used to cancel the conditional handover configured by the early handover command, that is, cancel a function of determining, by the terminal device, whether the terminal device performs cell handover.

If the terminal device receives the handover cancel command, the terminal device executes the handover cancel command, to cancel determining whether the terminal device performs cell handover, that is, cancel the conditional handover. In this case, the terminal device may stop measuring a downlink reference signal. This is equivalent to that the base station 1 completely determines whether the terminal device performs cell handover. Therefore, for example, if the base station 1 finds that a channel condition of the terminal device is getting better, the base station 1 may continue providing a service for the terminal device, and does not need to enable the terminal device to perform cell handover.

For S43 in the embodiment shown in FIG. 4, refer to S33 in the embodiment shown in FIG. 3. For S44 in the embodiment shown in FIG. 4, refer to S34 in the embodiment shown in FIG. 3. For S45 in the embodiment shown in FIG. 4, refer to S35 in the embodiment shown in FIG. 3. Details are not described herein again. It should be noted that because S43 to S45 are not mandatory steps, to distinguish S43 to S45 from a mandatory step, the arrows used to represent the three steps in FIG. 4 are dashed arrows.

S46. The base station 1 performs handover determining. In other words, the base station 1 determines whether the terminal device performs cell handover. S46 is not a mandatory step. Therefore, to distinguish S46 from a mandatory step, the arrow used to represent S46 in FIG. 4 is a dashed arrow.

A sequence of S46 and S43 to S45 are not limited in this specification.

That the base station 1 performs handover determining includes, but is not limited to, the following manners:

A. Uplink Measurement-based Handover Determining

To be specific, the base station 1 measures an uplink reference signal sent by the terminal device, to obtain a measurement report, and the base station 1 determines, based on the obtained measurement report, whether the terminal device performs cell handover.

This involves that the terminal device needs to send the uplink reference signal to the base station 1. In this case, the base station 1 may first configure uplink measurement for the terminal device. In other words, the base station 1 sends uplink configuration information to the terminal device. The uplink configuration information is used to instruct the terminal device to send the uplink reference signal to the base station 1. Specifically, the uplink configuration information indicates information such as a resource used by the terminal device to send the uplink reference signal and a period for sending the uplink reference signal. In this case, the terminal device sends the uplink reference signal to the base station 1 after receiving the uplink configuration information. For example, the base station 1 may send the uplink configuration information to the terminal device in S42, to be specific, add the uplink configuration information to the early handover command for sending; or the base station 1 may send the uplink configuration information to the terminal device at another time, for example, before S42 or before S40, provided that the base station 1 completes sending the uplink configuration information to the terminal device before S46. If the base station 1 adds the uplink configuration information to the early handover command and sends the early handover command carrying the uplink configuration information to the terminal device, it is equivalent to that the base station 1 may start to perform uplink measurement after sending the early handover command. This reduces more resources occupied to send the uplink reference signal and perform measurement than performing uplink measurement from the beginning does.

B. Downlink Measurement-Based Handover Determining

To be specific, the terminal device sends a measurement report to the base station 1, and the base station 1 receives the measurement report sent by the terminal device, and determines, based on the received measurement report, whether the terminal device performs cell handover.

Specifically, the terminal device measures the received downlink reference signal. For measurement performed by the terminal device on the downlink reference signal, refer to S43 and S44 in the embodiment shown in FIG. 4. After obtaining the measurement report, the terminal device may send the obtained measurement report to the base station 1. The base station 1 may first send measurement reporting information to the terminal device, and the measurement reporting information is used to instruct the terminal device to send the measurement report to the base station 1. After receiving the measurement reporting information, the terminal device sends the measurement report obtained by the terminal device to the base station 1.

For example, the base station 1 may send the measurement reporting information to the terminal device in S42, to be specific, add the measurement reporting information to the early handover command for sending; or the base station 1 may send the measurement reporting information to the terminal device at another time, for example, before S42 or before S40, provided that the base station 1 completes sending the measurement reporting information to the terminal device before S46. If the base station 1 sends the measurement reporting information to the terminal device before S42, the terminal device performs conditional determining after receiving the early handover command in S42. In this case, the terminal device may continue performing downlink measurement, that is, continue measuring a downlink reference signal sent by the base station 1 or another base station (for example, a base station 2), and may continue sending a newly obtained measurement report to the base station 1 based on a reporting condition of the measurement report. In this way, the base station 1 can conveniently obtain the latest measurement report in time, to more accurately determine whether the terminal device performs cell handover. In addition, the terminal device continuously measures the downlink reference signal. If the terminal device fails to perform handover when the base station instructs the terminal device to perform cell handover, the terminal device may further determine, based on the measurement report obtained by the terminal device, whether to perform cell handover, to ensure that the terminal device can complete handover when handover is required. Alternatively, in this case, the terminal device may stop performing downlink measurement, that is, cancel the process of measuring the downlink reference signal sent by the base station. In this way, consumption of the terminal device may be reduced.

C. Timer-Based Handover Determining

Such a manner may be understood as a determining manner based on implementation of the base station 1. For example, the base station 1 sets a timer, and when the timer expires, the base station 1 triggers the terminal device to perform cell handover.

In this manner, the base station 1 may alternatively perform handover determining according the manner A or manner B described above. If before the timer expires, the base station 1 has already triggered, based on the determining in the manner A or the manner B, the terminal device to perform cell handover, the base station 1 may turn off the timer. If before the timer expires, the base station 1 has not triggered, based on the determining in the manner A or the manner B, the terminal device to perform cell handover, the base station 1 triggers, when the timer expires, the terminal device to perform cell handover.

Alternatively, in this manner, the base station 1 may not perform handover determining. To be specific, the base station 1 does not determine whether the terminal device performs cell handover, and the base station 1 triggers, when the timer expires, the terminal device to perform cell handover.

As can be learned, in the manner A or manner B described above, the base station performs handover determining. A determining result may be triggering the terminal device to perform cell handover, or may be determining that the terminal device does not perform cell handover. However, in the manner C, the terminal device basically performs cell handover for sure.

The foregoing three handover determining manners may be selected based on situations.

S47. The base station 1 sends a handover command to the terminal device, and the terminal device receives the handover command. The handover command is used to instruct the terminal device to perform cell handover. That is, if the base station 1 determines, in the determining manner described in S46, that the terminal device performs cell handover, the base station 1 sends the handover command to the terminal device. If the terminal device that is performing conditional determining receives the handover command sent by the base station 1, the terminal device immediately executes the handover command, and starts to perform cell handover instead of performing conditional determining.

After receiving the handover command sent by the base station, the terminal device may stop measuring the downlink reference signal, that is, cancel measurement on the downlink reference signal, to reduce operations and computation of the terminal device by terminating the measurement process. Alternatively, the terminal device continues measuring the downlink reference signal even if the terminal device receives the handover command sent by the base station 1. In this way, if the terminal device fails to access the target cell according to the handover command, the terminal device may reselect, based on a downlink measurement report of the terminal device, a best cell for access.

In another example, the terminal device waits for the handover command. In this example, the base station 1 has sent the handover cancel command to the terminal device according to the description in S42, and the terminal device has received the handover cancel command and canceled conditional handover configured by the early handover command. In this case, the terminal device can wait only for the handover command, because the terminal device cannot perform conditional determining by itself.

In an example, the terminal device chooses to execute either of the conditional handover and the handover command that is triggered first. A delay may be reduced in this manner. In this example, the base station 1 does not send the handover cancel command to the terminal device according to the description in S42. For example, if the terminal device does not trigger cell handover in the conditional handover process, but the terminal device receives the handover command sent by the base station 1, the terminal device executes the handover command. In other words, the handover command arrives before the handover condition of the conditional handover is met. In this case, before S46, the handover condition of the conditional handover of the terminal device is not met yet. Alternatively, if the terminal device triggers cell handover through a conditional handover process before receiving the handover command sent by the base station 1, the terminal device performs cell handover based on triggering of the conditional handover process. In other words, the handover condition of the conditional handover is already met before the handover command arrives. In this case, the base station 1 and the terminal device no longer perform S47. Considering that the terminal device starts conditional determining after S42, if the handover condition of the conditional handover is already met before the handover command arrives, where any one of moments at which steps S43 to S47 are performed may be a moment at which the handover condition is met, a step after the moment at which the handover condition is met is no longer performed. Instead, S48 to be described below is directly performed.

In another example, the terminal device always waits for the handover command. In this example, the base station 1 does not send the handover cancel command to the terminal device according to the description in S42. In this example, the terminal device does not perform handover even if the handover condition of the conditional handover of the terminal device is already met. Instead, the terminal device waits for the handover command sent by the base station 1. In this case, before S46, the handover condition of the conditional handover of the terminal device may be met already, or may not be met yet. That is, the terminal device always waits for a notification of the base station. Once receiving the handover command sent by the base station 1, the terminal device immediately performs handover. In this way, a network side can better control the terminal device, and factors such as uplink coverage, load, interference, and access policies of a serving base station and a neighboring base station may be comprehensively considered to control handover of the terminal device.

In this embodiment, the handover command sent by the base station 1 may carry a cell identifier. The cell identifier is determined by the base station 1 by measuring the uplink reference signal sent by the terminal device, and is a cell identifier of a cell to which the terminal device can hand over; or the cell identifier may be determined by another base station (for example, the base station 2) by measuring the uplink reference signal sent by the terminal device, and is a cell identifier of a cell to which the terminal device can hand over. If the cell identifier is obtained by the base station 2 through measurement, the base station 2 sends the obtained cell identifier to the base station 1, and the base station 1 may add, to the handover command, the received cell identifier sent by the base station 2. In this case, if the terminal device receives the handover command sent by the base station 1, the terminal device executes the handover command, and hands over to the target cell indicated by the handover command. In other words, the terminal device may select one cell identifier from cell identifiers carried in the handover command as the cell identifier of the target cell, to hand over to the target cell. In this case, if the terminal device also determines, based on the conditional handover process, some cell identifiers of cells to which the terminal device can hand over, the terminal device may ignore the cell identifiers determined based on the conditional handover process. In other words, the terminal device preferentially performs handover based on an instruction of the base station 1.

Alternatively, the handover command sent by the base station 1 may not carry a cell identifier. In other words, the base station 1 only instructs the terminal device to perform handover, but does not notify the terminal device of cells to which the terminal device can hand over. Therefore, after receiving the handover command, the terminal device may select the target cell based on the measurement report obtained by the terminal device, where the measurement report may be obtained by the terminal device by measuring the downlink reference signal sent by the base station 1 and/or another base station (for example, the base station 2). Obviously, such a manner is more applicable to the case in which the base station 2 does not send the handover cancel command to the terminal device.

Either of the cell indicated by the handover command or the cell determined by the terminal device based on the measurement report obtained by the terminal device may be a cell provided by the base station 1 or may be a cell provided by another base station (for example, the base station 2).

S48. The terminal device performs an access process. In FIG. 4, an example in which the target cell of the terminal device is a cell provided by the base station 2 is used.

For a random access process of the terminal device, refer to the prior art. Details are not described herein.

By implementing the cell handover method provided in this embodiment, the network side can control the terminal device even in the conditional handover process of the terminal device. For example, based on an actual network status, the base station may deliver the handover command before the terminal device obtains a conditional determining result, to trigger in advance the terminal device to perform handover, thereby shortening a handover delay.

Figure 5:
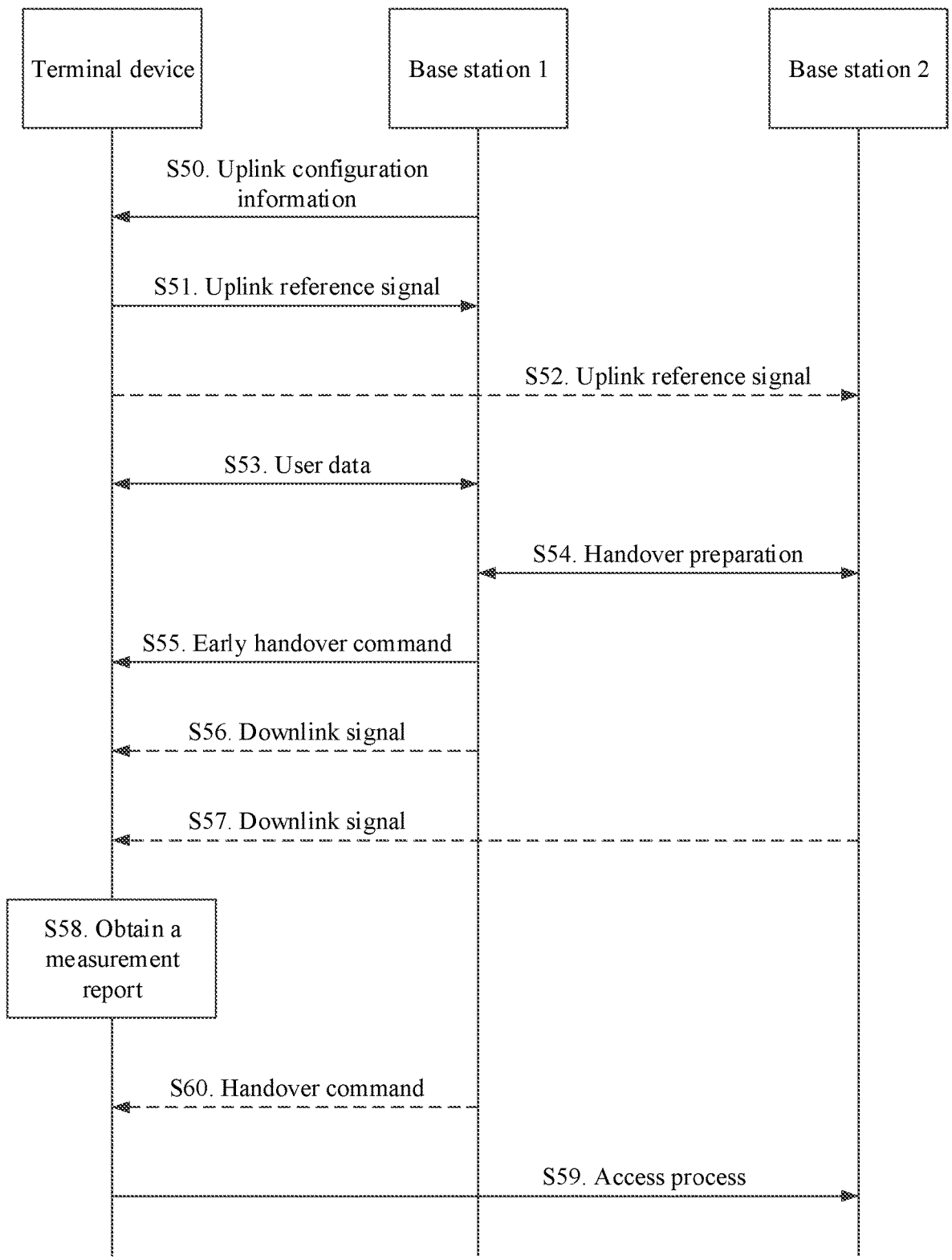
FIG. 5 is a flowchart of a cell handover method according to one embodiment.

In the embodiment shown in FIG. 4, how to strengthen control of the network side over the terminal device in the conditional handover process of the terminal device is mainly described. The following describes a cell handover method by using another embodiment. In this embodiment, how a terminal device selects a target cell is mainly described. FIG. 5 is a flowchart of the method. In the following description process, an example in which the method is applied to the application scenario shown in FIG. 1 or the application scenario shown in FIG. 2 is used, and an example in which a cell 1, a cell 2, or a cell 3 provided by a base station 1 is a serving cell of a terminal device before handover is used.

S50. The base station 1 sends uplink configuration information to the terminal device, and the terminal device receives the uplink configuration information. The uplink configuration information is used to instruct the terminal device to send an uplink reference signal to the base station 1. Specifically, the uplink configuration information indicates information such as a resource used by the terminal device to send the uplink reference signal and a period for sending the uplink reference signal.

S51. The terminal device sends the uplink reference signal to the base station 1, and the base station 1 receives the uplink reference signal sent by the terminal device. In this case, the base station 1 may measure the uplink reference signal sent by the terminal device, to obtain a measurement report.

After obtaining the measurement report, the base station 1 may determine cell identifiers based on the obtained measurement report. The cell identifiers are cell identifiers of target cells to which the terminal device can hand over.

S52. The terminal device sends the uplink reference signal to a base station 2, and the base station 2 receives the uplink reference signal sent by the terminal device. Specifically, the uplink reference signal that is received by the base station 2 and that is sent by the terminal device may be an uplink reference signal directly sent by the terminal device or an uplink reference signal that is received by the base station 2 from the base station 1 and that is sent by the terminal device. In this case, the base station 2 may measure the uplink reference signal sent by the terminal device, to obtain a measurement report.

In addition to being received by the base station 1, the uplink reference signal sent by the terminal device may also be received by another base station. In S52, an example in which the base station 2 also receives the uplink reference signal sent by the terminal device is used. If the base station 2 measures the uplink reference signal sent by the terminal device and obtains the measurement report, the base station 2 may send the obtained measurement report to the base station 1, or the base station 2 may send cell identifiers determined based on the measurement report obtained by the base station 2 to the base station 1. The cell identifiers are the cell identifiers of the target cells to which the terminal device can hand over.

Because the base station 2 may receive the uplink reference signal sent by the terminal device or may not receive the uplink reference signal sent by the terminal device, the arrow used to represent S52 in FIG. 5 is a dashed arrow.

S53. The terminal device exchanges some user data with the base station 1. That is, the terminal device exchanges user data with the serving cell provided by the base station 1.

The base station 1 may perform handover determining based on the user data. The handover determining herein is different from determining whether the terminal device performs cell handover described in the following portion of this specification. Instead, the handover determining may be understood as determining whether to send an early handover command to the terminal device.

S54. The base station 1 and the base station 2 perform configuration and prepare for HO.

For example, the base station 1 and the base station 2 perform active mode reference signal resource pre-configuration and handover preparation. The base station 2 may notify the base station 1 of configuration information for handover of the terminal device.

S55. The base station 1 sends the early handover command to the terminal device through the serving cell, and the terminal device receives the early handover command.

The early handover command is used to instruct the terminal device to determine whether to perform cell handover. In other words, the terminal device knows, based on the early handover command, that the terminal device needs to determine whether to perform conditional handover.

The early handover command may further carry a handover condition of the conditional handover, and the terminal device may perform determining based on the handover condition.

In addition, the early handover command may further carry the cell identifiers determined by the base station 1 and/or the cell identifiers determined by the base station 2.

For S56 in the embodiment shown in FIG. 5, refer to S33 in the embodiment shown in FIG. 3. For S57 in the embodiment shown in FIG. 5, refer to S34 in the embodiment shown in FIG. 3. For S58 in the embodiment shown in FIG. 5, refer to S35 in the embodiment shown in FIG. 3. Details are not described herein again. It should be noted that because S56 and S57 are not mandatory steps, to distinguish S56 and S57 from a mandatory step, the arrows used to represent the two steps in FIG. 5 are dashed arrows.

S59. The terminal device performs an access process. In FIG. 5, an example in which the target cell of the terminal device is a cell provided by the base station 2 is used.

The terminal device hands over from the current serving cell to the target cell. The target cell is determined by the terminal device based on the measurement report obtained by the terminal device through measurement, and/or is determined by the terminal device based on the received cell identifiers sent by the base station 1.

In an example, the terminal device may determine, based on the conditional handover, whether to perform cell handover. If the terminal device determines to perform cell handover, the terminal device determines the target cell based on the measurement report obtained by the terminal device through measurement and/or based on the received cell identifiers sent by the base station 1.

In another example, the terminal device may determine, based on a handover command sent by the base station 1, to perform cell handover. In this manner, the base station 1 determines, based on the measurement report obtained by the base station 1 and/or the received measurement report sent by the base station 2, that the terminal device needs to perform cell handover, and the base station 1 sends the handover command to the terminal device before S59, referring to S60 in FIG. 5. Because the base station 1 already sends the cell identifiers to the terminal device by using the early handover command in S55, the base station 1 may no longer add the cell identifiers to the handover command. In addition, because sending the handover command by the base station 1 to the terminal device is only an embodiment and is not a mandatory step, the arrow used to represent S60 in FIG. 5 is a dashed arrow.

If the terminal device receives the handover command sent by the base station 1, the terminal device may stop performing conditional determining, and immediately execute the handover command. Similarly, the target cell is still determined based on the measurement report obtained by the terminal device through measurement and/or based on the received cell identifiers sent by the base station 1.

That is, this embodiment also relates to two processes: the conditional handover and the handover that is notified of by the base station. The terminal device may choose to perform handover that is triggered first. For example, if the terminal device does not trigger cell handover in the conditional handover process, but the terminal device receives the handover command sent by the base station 1, the terminal device executes the handover command. Alternatively, if the terminal device triggers cell handover through a conditional handover process before receiving the handover command sent by the base station 1, the terminal device performs cell handover based on triggering of the conditional handover process.

In this embodiment, the terminal device may select a best cell, as the target cell, from cells whose cell identifiers are sent by the base station 1 and/or cells whose cell identifiers are determined by the terminal device, so that a selection range of the target cell is wider, and it is more helpful to select a cell having better performance.

Figure 6:
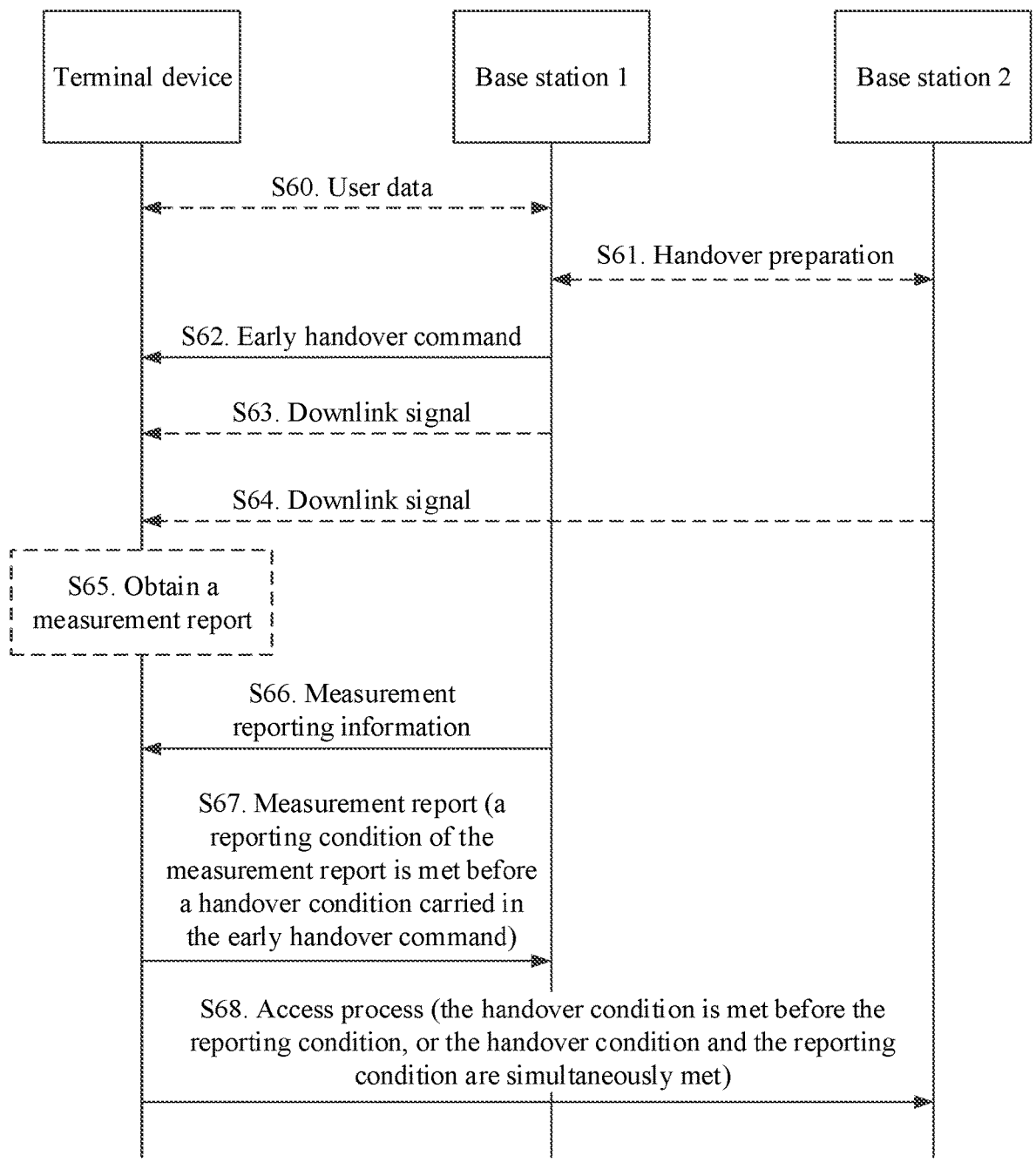
FIG. 6 is a flowchart of a cell handover method according to one embodiment.

In the embodiment shown in FIG. 4, how to strengthen control of the network side over the terminal device in the conditional handover process of the terminal device is mainly described. In the embodiment shown in FIG. 5, how the terminal device selects the target cell is mainly described. The following describes a cell handover method by using another embodiment. In this embodiment, when a terminal device sends a measurement report in a conditional handover process is mainly described. FIG. 6 is a flowchart of the method. In the following description process, an example in which the method is applied to the application scenario shown in FIG. 1 or the application scenario shown in FIG. 2 is used, and an example in which a cell 1, a cell 2, or a cell 3 provided by a base station 1 is a serving cell of a terminal device before handover, and a cell 4 or a cell 5 provided by a base station 2 is a target cell of the terminal device is used.

For S60 in the embodiment shown in FIG. 6, refer to S30 in the embodiment shown in FIG. 3. For S61 in the embodiment shown in FIG. 6, refer to S31 in the embodiment shown in FIG. 3. Details are not described herein again. It should be noted that because S60 and S61 are not mandatory steps, to distinguish S60 and S61 from a mandatory step, the arrows used to represent the two steps in FIG. 6 are dashed arrows.

S62. The base station 1 sends an early handover command to the terminal device through the serving cell, and the terminal device receives the early handover command.

The early handover command is used to instruct the terminal device to determine whether to perform cell handover. In other words, the terminal device knows, based on the early handover command, that the terminal device needs to determine whether to perform conditional handover.

The early handover command may further carry a handover condition of the conditional handover, and the terminal device may perform determining based on the handover condition.

For S63 in the embodiment shown in FIG. 6, refer to S33 in the embodiment shown in FIG. 3. For S64 in the embodiment shown in FIG. 6, refer to S34 in the embodiment shown in FIG. 3. For S65 in the embodiment shown in FIG. 6, refer to S35 in the embodiment shown in FIG. 3. Details are not described herein again. It should be noted that because S63 to S65 are not mandatory steps, to distinguish S63 to S65 from a mandatory step, the arrows used to represent the three steps in FIG. 6 are dashed arrows.

S66. The base station 1 sends measurement reporting information to the terminal device through the serving cell, and the terminal device receives the measurement reporting information. The measurement reporting information is used to instruct the terminal device to send an obtained measurement report to the base station 1.

The measurement reporting message may further carry a reporting condition of the measurement report, or a reporting condition of the measurement report may be determined by the terminal device, or may be determined based on a protocol or a standard. In conclusion, the terminal device sends the measurement report obtained by the terminal device to the base station 1 only when the reporting condition of the measurement report is met. For example, a reporting condition of the measurement report is that the measurement report obtained by the terminal device continuously meets a measurement threshold within timer-to-trigger (TTT) duration.

If the reporting condition of the measurement report is met before the handover condition carried in the early handover command, the following S67 is performed. If the handover condition carried in the early handover command is met before the reporting condition of the measurement report, or the handover condition carried in the early handover command and the reporting condition of the measurement report are simultaneously met, the following S68 is performed.

S66 may be performed before S62, or may be performed at any time from S62 to S65, or may be performed after S65. This is not limited in this embodiment.

S67. If the reporting condition of the measurement report is met before the handover condition carried in the early handover command, the terminal device sends the measurement report to the base station 1.

In this way, after receiving the measurement report, the base station 1 may determine, based on the measurement report, whether the terminal device needs to perform cell handover.

S68. If the handover condition carried in the early handover command is met before the reporting condition of the measurement report, or the handover condition carried in the early handover command and the reporting condition of the measurement report are simultaneously met, the terminal device hands over from the current serving cell to a target cell. That is, the terminal device performs an access process of accessing the base station 2. In this case, the terminal device performs cell handover based on a determining result of the conditional handover.

In this manner, the base station 1 and/or the terminal device may determine in time whether the terminal device performs cell handover, so that the terminal device may perform cell handover as soon as possible.

Figure 7:
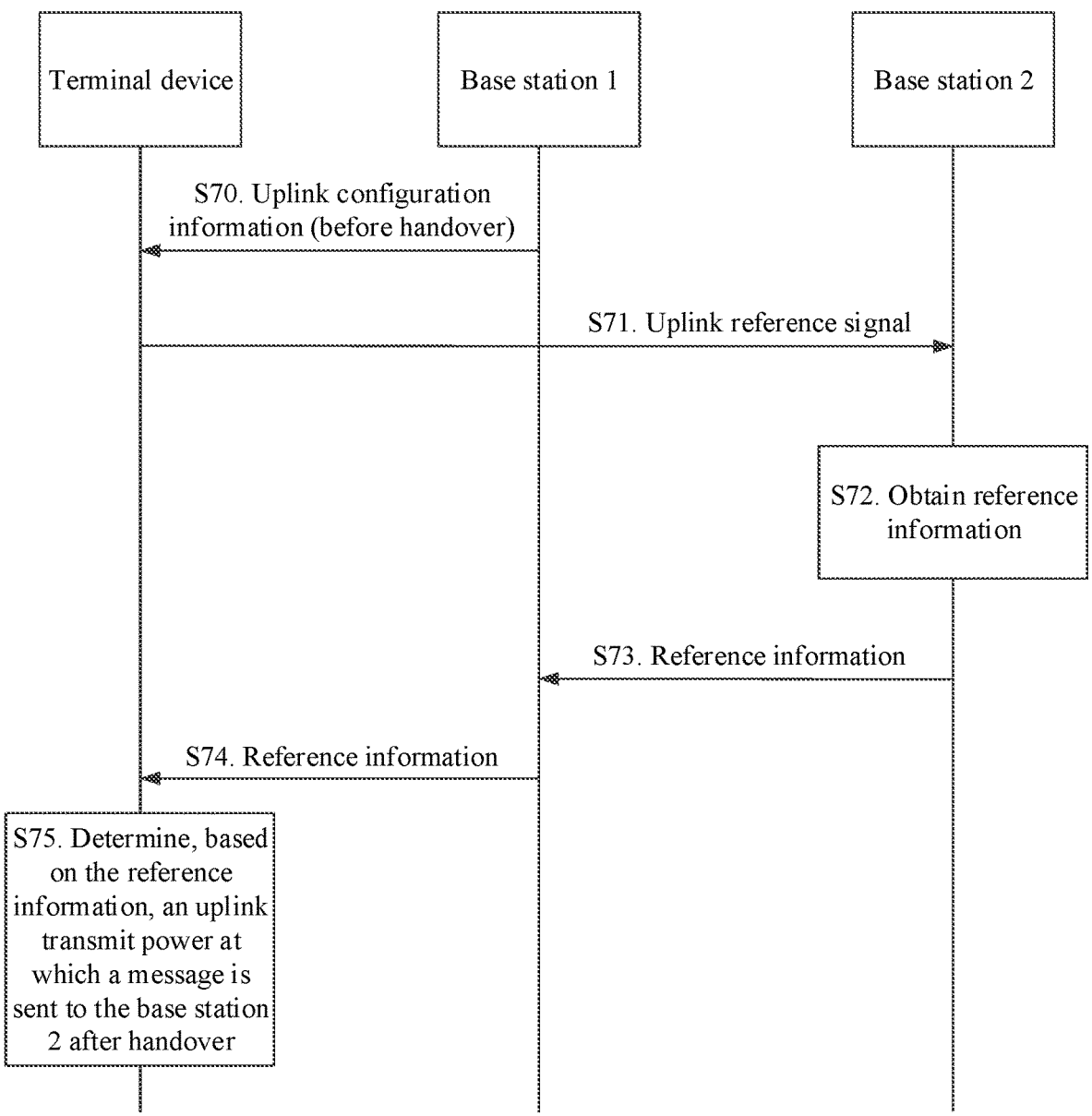
FIG. 7 is a flowchart of a method for determining an uplink transmit power according to one embodiment.

The foregoing embodiments all describe the method for performing cell handover by the terminal device. After performing cell handover, the terminal device needs to communicate with a new cell. This relates to a problem of determining an uplink transmit power used by the terminal device for the new cell. The following provides an embodiment, to describe a method for determining an uplink transmit power by a terminal device. This embodiment may be an individual embodiment, or may be combined with any one of the embodiment shown in FIG. 3 to the embodiment shown in FIG. 6. FIG. 7 is a flowchart of the method. In the following description process, an example in which the method is applied to the application scenario shown in FIG. 1 or the application scenario shown in FIG. 2 is used, and an example in which a cell 1, a cell 2, or a cell 3 provided by a base station 1 is a serving cell of a terminal device before handover, and a cell 4 or a cell 5 provided by a base station 2 is a target cell of the terminal device is used.

For S70 in the embodiment shown in FIG. 7, refer to S50 in the embodiment shown in FIG. 5. Details are not described herein again.

S71. Before handing over to the base station 2, the terminal device sends an uplink reference signal to the base station 2, and the base station 2 receives the uplink reference signal sent by the terminal device. In this case, the serving cell of the terminal device is still a cell provided by the base station 1. Specifically, the uplink reference signal that is received by the base station 2 and that is sent by the terminal device may be an uplink reference signal directly sent by the terminal device or an uplink reference signal that is received by the base station 2 from the base station 1 and that is sent by the terminal device.

S72. The base station 2 may obtain reference information based on the received uplink reference signal, where the reference information is used to indicate an uplink transmit power of the terminal device.

For example, the reference information obtained by the base station 2 may include an offset and/or an uplink path loss. The offset is an offset based on an initial transmit power of the terminal device. To be specific, the base station 2 may determine the initial transmit power of the terminal device based on the received uplink reference signal. The base station 2 adds the offset to the initial transmit power. A sum of the initial transmit power and the offset may be used as an uplink transmit power of the terminal device after handover. Because the terminal device knows the initial transmit power of the terminal device, the base station 2 only needs to send the offset to the terminal device. For example, the uplink transmit power of the terminal device that is determined based on the offset is as follows:

$$\text{PPRACH} = \min\{P_{CMAX}, \text{PREAMBLE\_RECEIVED\_TARGET\_POWER} + \text{uplink } PL + \text{offset}\}\_[dBm] \quad (1)$$

In Formula (1), PPRACH represents an uplink transmit power of the terminal device, $P_{CMAX}$ represents a maximum transmit power of the terminal device, PREAMBLE_RECEIVED_TARGET_POWER represents a target uplink receive power of the base station 2, PL represents an uplink path loss, and offset represents an offset.

The uplink path loss is obtained by the base station 2 based on an initial transmit power for the uplink reference signal that is sent by the terminal device and that is received from the base station 1 and a receive power at which the base station 2 receives the uplink reference signal. For example, the uplink path loss is calculated in the following manner:

$$\text{Uplink } PL = P1 - P2 \qquad (2)$$

In Formula (2), P1 represents the initial transmit power at which the terminal device sends the uplink reference signal, and P2 represents a receive power at which the base station 2 receives the uplink reference signal. In this way, if the determined uplink path loss is relatively large, the terminal device needs to access the base station 2 at a relatively high uplink transmit power; and if the determined uplink path loss is relatively small, the terminal device needs to access the base station 2 at a relatively low transmit power. In this manner, the uplink transmit power of the terminal device after handover can be relatively accurately determined, and a delay during initial access of the terminal device caused by increasing a power because the uplink transmit power is relatively low can be reduced, or interference during initial access of the terminal device caused due to an excessively high uplink transmit power can be reduced.

In addition, the terminal device also sends the uplink reference signal to the base station 1, and the base station 1 may also obtain the reference information based on the uplink reference signal sent by the terminal device. Details are not described herein.

S73. The base station 2 sends the obtained reference information to the base station 1, and the base station 1 receives the reference information sent by the base station 2.

S74. The base station 1 sends reference information to the terminal device, and the terminal device receives the reference information sent by the base station 1.

For example, the base station 1 sends the reference information to the terminal device by using an early handover command, or if the base station 1 sends a handover command to the terminal device, the base station 1 may send the reference information to the terminal device by using the handover command.

The reference information sent by the base station 1 to the terminal device may include the reference information determined by the base station 1 and/or the reference information determined by the base station 2.

S75. The terminal device determines, based on the received reference information, an uplink transmit power at which the terminal device sends a message to the base station 2.

When the terminal device is handing over to the base station 2 or after the terminal device has handed over to the base station 2, the base station 2 can receive the message sent by the terminal device at the determined uplink transmit power. For example, when accessing the base station 2 through a random access process, the terminal device uses the determined uplink transmit power when sending the first message in the random access process, or the terminal device uses the determined uplink transmit power when sending the first scheduling-free message.

In this embodiment, a target cell may determine an uplink transmit power of the terminal device after the handover, so that the determined uplink transmit power is more accurate.

An apparatus provided in an embodiment is described below with reference to the accompanying drawings.

Figure 8:
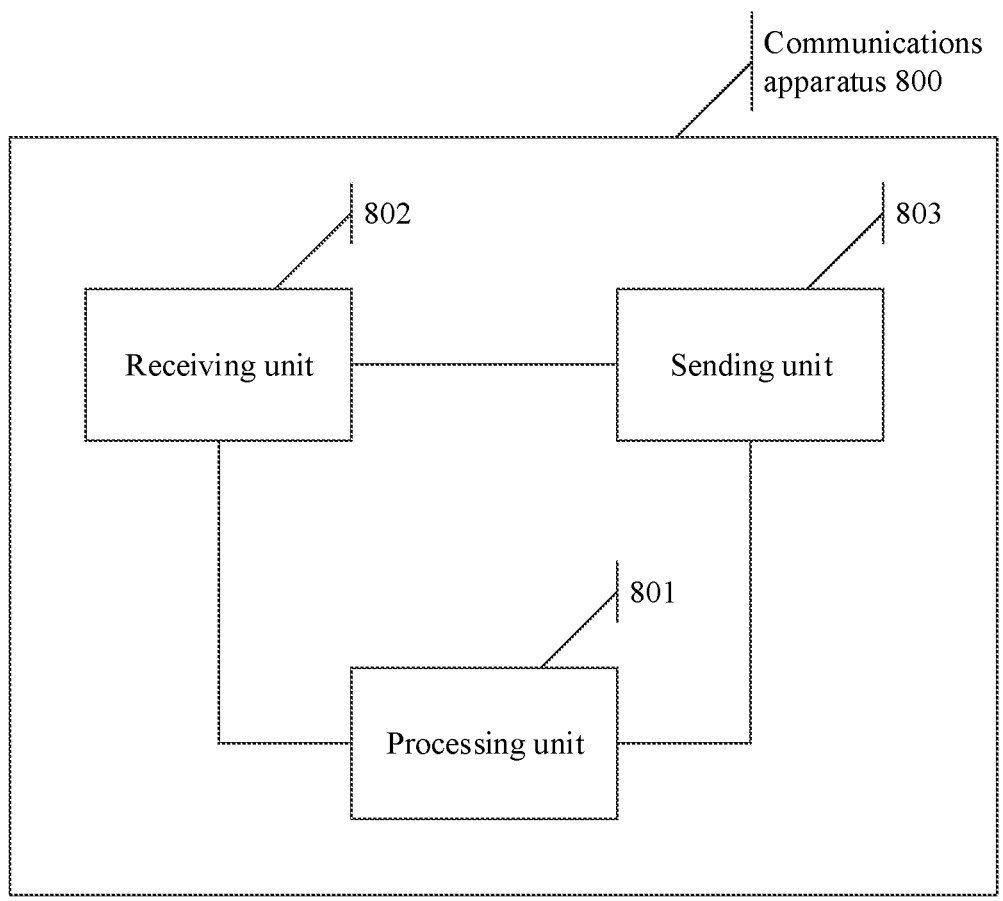
FIG. 8 to FIG. 15 are schematic structural diagrams of communications apparatuses according to one embodiment.

FIG. 8 is a schematic structural diagram of a communications apparatus 800. The communications apparatus 800 may implement functions of the terminal device described above. The communications apparatus 800 may include a processing unit 801 and a receiving unit 802. In one embodiment, the communications apparatus 800 may further include a sending unit 803. The processing unit 801 may be configured to perform S35 and S38 in the embodiment shown in FIG. 3, and S45 and S48 in the embodiment shown in FIG. 4, and/or configured to support another process of the technology described in this specification. The receiving unit 802 may be configured to perform S32, S33, and S34 in the embodiment shown in FIG. 3, and S42, S43, S44, and S47 in the embodiment shown in FIG. 4, and/or configured to support another process of the technology described in this specification. The sending unit 803 may be configured to perform S36 and S39 in the embodiment shown in FIG. 3, and/or configured to support another process of the technology described in this specification. All related content of the steps in the foregoing method embodiments may be cited in function descriptions of corresponding functional modules. Details are not described herein again.

Figure 9:
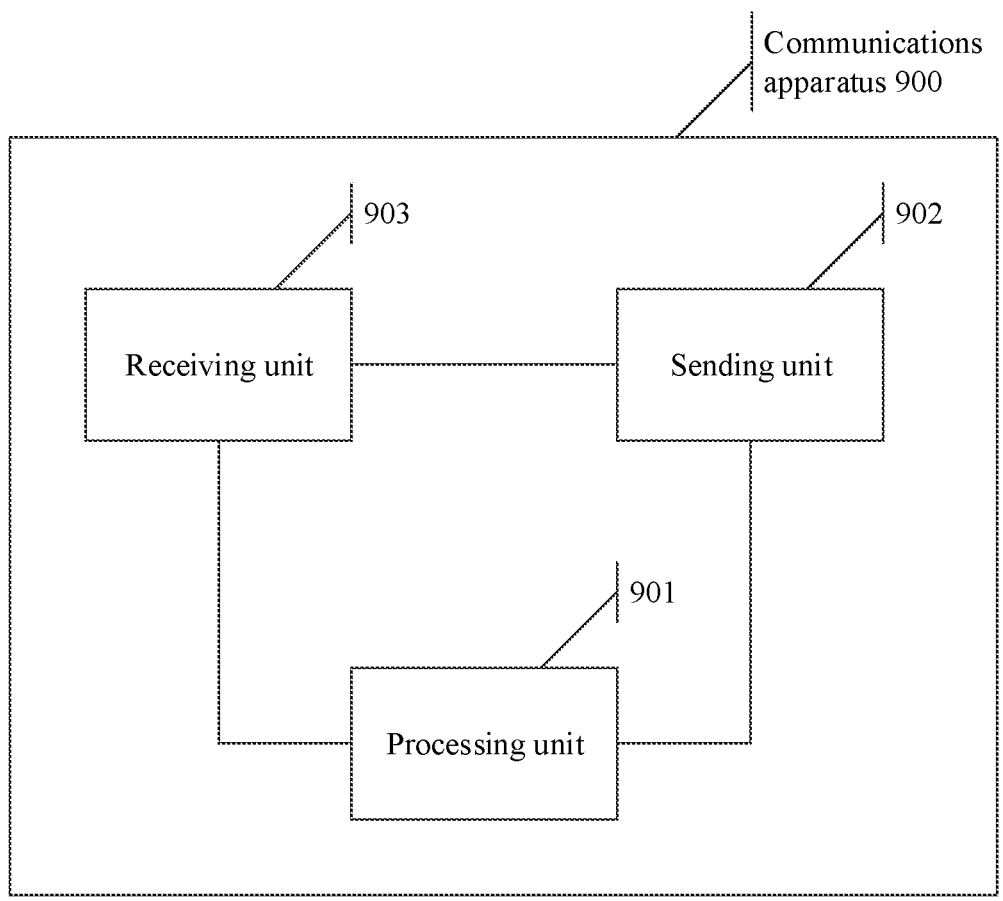

FIG. 9 is a schematic structural diagram of a communications apparatus 900. The communications apparatus 900 may implement functions of the network device described above. The communications apparatus 900 may include a processing unit 901 and a sending unit 902. In one embodiment, the communications apparatus 900 may further include a receiving unit 903. The processing unit 901 may be configured to perform S46 in the embodiment shown in FIG. 4, and/or configured to support another process of the technology described in this specification. The sending unit 902 may be configured to perform S32, S33, and S37 in the embodiment shown in FIG. 3, and S42 and S47 in the embodiment shown in FIG. 4, and/or configured to support another process of the technology described in this specification. The receiving unit 903 may be configured to perform S36 and S39 in the embodiment shown in FIG. 3, and/or configured to support another process of the technology described in this specification. All related content of the steps in the foregoing method embodiments may be cited in function descriptions of corresponding functional modules. Details are not described herein again.

Figure 10:
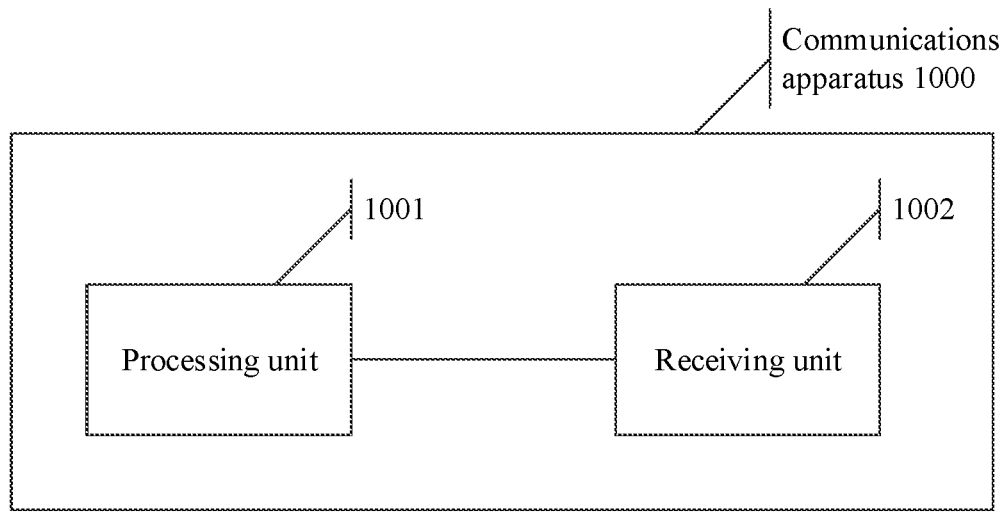

FIG. 10 is a schematic structural diagram of a communications apparatus 1000. The communications apparatus 1000 may implement functions of the terminal device described above. The communications apparatus 1000 may include a processing unit 1001 and a receiving unit 1002. The processing unit 1001 may be configured to perform S59 in the embodiment shown in FIG. 5, and/or configured to support another process of the technology described in this specification. The receiving unit 1002 may be configured to perform S55 and S60 in the embodiment shown in FIG. 5, and/or configured to support another process of the technology described in this specification. All related content of the steps in the foregoing method embodiments may be cited in function descriptions of corresponding functional modules. Details are not described herein again.

Figure 11:
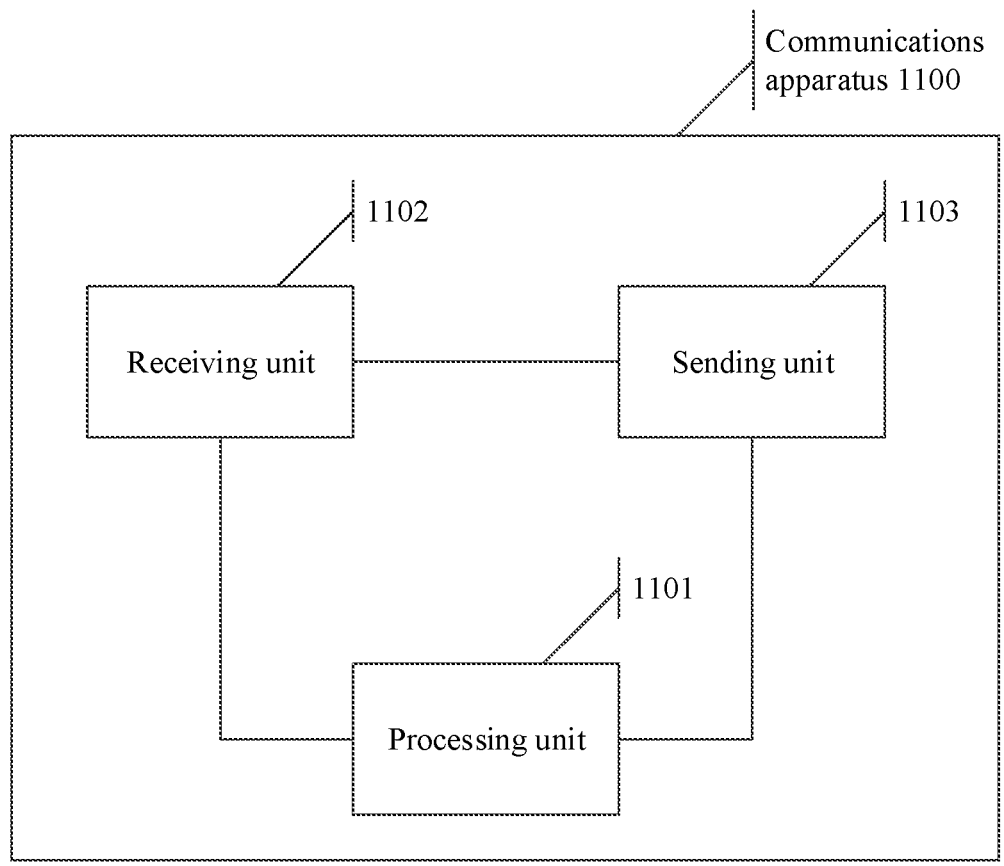

FIG. 11 is a schematic structural diagram of a communications apparatus 1100. The communications apparatus 1100 may implement functions of the network device described above. The communications apparatus 1100 may include a processing unit 1101, a receiving unit 1102, and a sending unit 1103. The processing unit 1101 may be configured to perform S51 and S53 in the embodiment shown in FIG. 5, and/or configured to support another process of the technology described in this specification. The receiving unit 1102 may be configured to perform S51 in the embodiment shown in FIG. 5, and/or configured to support another process of the technology described in this specification. The sending unit 1103 may be configured to perform S55 and S60 in the embodiment shown in FIG. 5, and/or configured to support another process of the technology described in this specification. All related content of the steps in the foregoing method embodiments may be cited in function descriptions of corresponding functional modules. Details are not described herein again.

Figure 12:
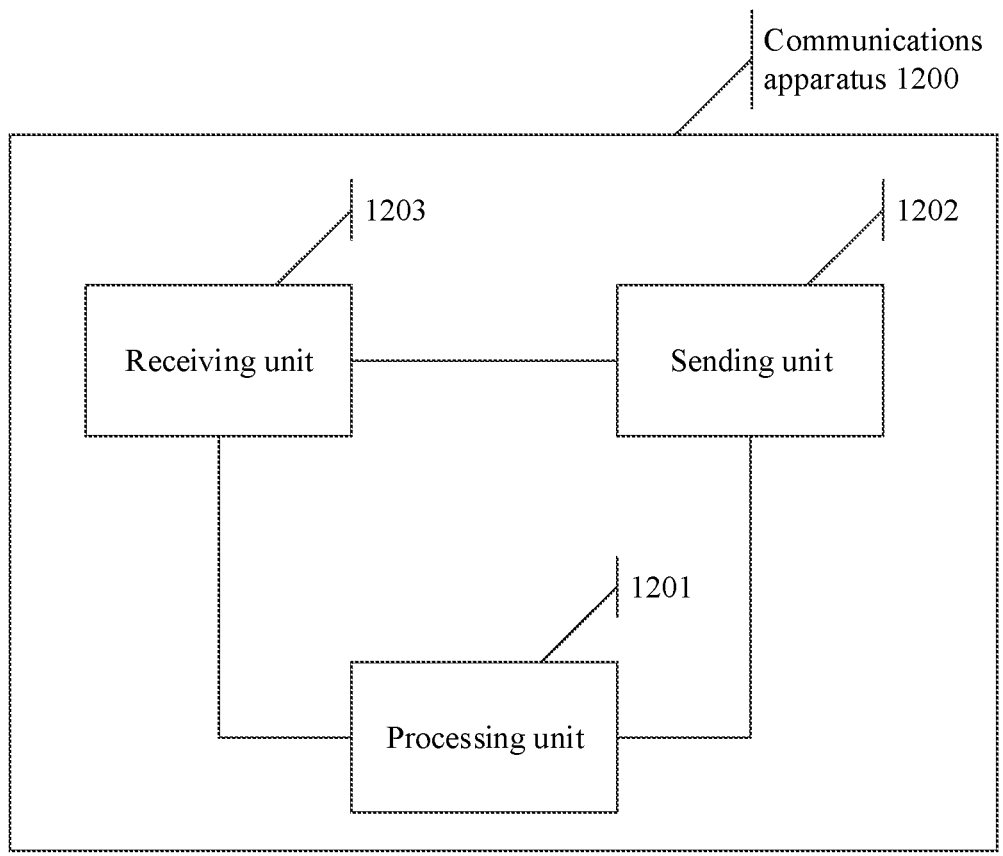

FIG. 12 is a schematic structural diagram of a communications apparatus 1200. The communications apparatus 1200 may implement functions of the network device described above. The communications apparatus 1200 may include a processing unit 1201 and a sending unit 1202. In one embodiment, the communications apparatus 1200 further includes a receiving unit 1203. The processing unit 1201 may be configured to perform S72 in the embodiment shown in FIG. 7, and/or configured to support another process of the technology described in this specification. The sending unit 1202 may be configured to perform S73 in the embodiment shown in FIG. 7, and/or configured to support another process of the technology described in this specification. The receiving unit 1203 may be configured to perform S71 in the embodiment shown in FIG. 7, and/or configured to support another process of the technology described in this specification. All related content of the steps in the foregoing method embodiments may be cited in function descriptions of corresponding functional modules. Details are not described herein again.

Figure 13:
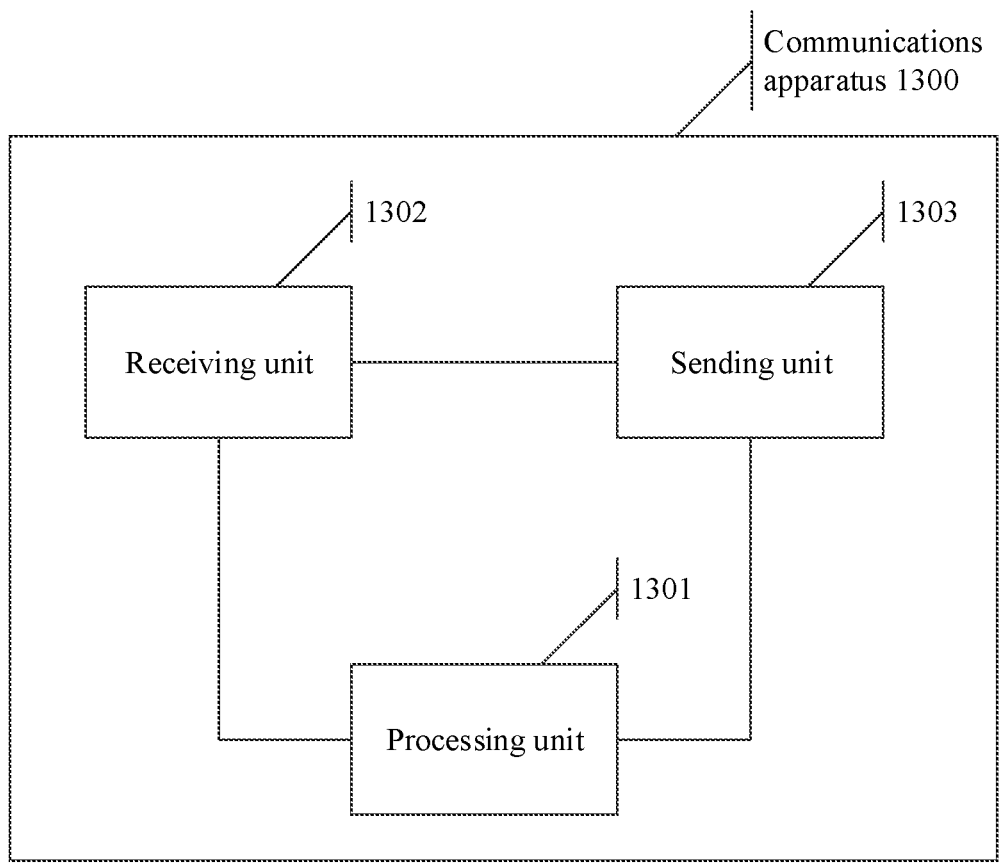

FIG. 13 is a schematic structural diagram of a communications apparatus 1300. The communications apparatus 1300 may implement functions of the terminal device described above. The communications apparatus 1300 may include a processing unit 1301 and a receiving unit 1302. In one embodiment, the communications apparatus 1300 further includes a sending unit 1303. The processing unit 1301 may be configured to perform S75 in the embodiment shown in FIG. 7, and/or configured to support another process of the technology described in this specification. The receiving unit 1302 may be configured to perform S74 in the embodiment shown in FIG. 7, and/or configured to support another process of the technology described in this specification. The sending unit 1303 may be configured to perform S71 in the embodiment shown in FIG. 7, and/or configured to support another process of the technology described in this specification. All related content of the steps in the foregoing method embodiments may be cited in function descriptions of corresponding functional modules. Details are not described herein again.

Figure 14:
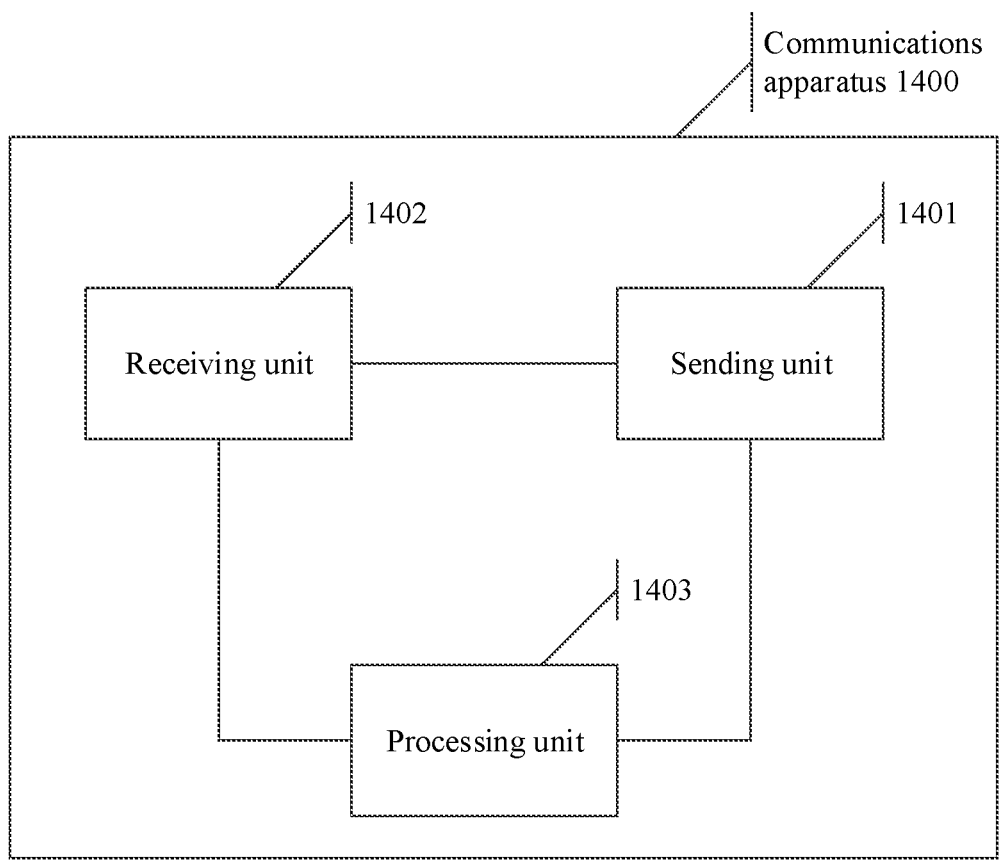

FIG. 14 is a schematic structural diagram of a communications apparatus 1400. The communications apparatus 1400 may implement functions of the terminal device described above. The communications apparatus 1400 may include a sending unit 1401 and a receiving unit 1402. In one embodiment, the communications apparatus 1400 further includes a processing unit 1403. The sending unit 1401 may be configured to perform S67 in the embodiment shown in FIG. 6, and/or configured to support another process of the technology described in this specification. The receiving unit 1402 may be configured to perform S62 and S66 in the embodiment shown in FIG. 6, and/or configured to support another process of the technology described in this specification. The processing unit 1403 may be configured to perform S68 in the embodiment shown in FIG. 6, and/or configured to support another process of the technology described in this specification. All related content of the steps in the foregoing method embodiments may be cited in function descriptions of corresponding functional modules. Details are not described herein again.

In the embodiments described herein, the communications apparatus 800 to the communications apparatus 1400 are presented in a form in which each functional module is defined in a correspondence to each function, or may be presented in a form in which each functional module is defined in an integrated manner. The "module" herein may be an application-specific integrated circuit (ASIC), a processor and a memory for executing one or more software or firmware programs, an integrated logic circuit, and/or another component that can provide the foregoing function.

Figure 15:
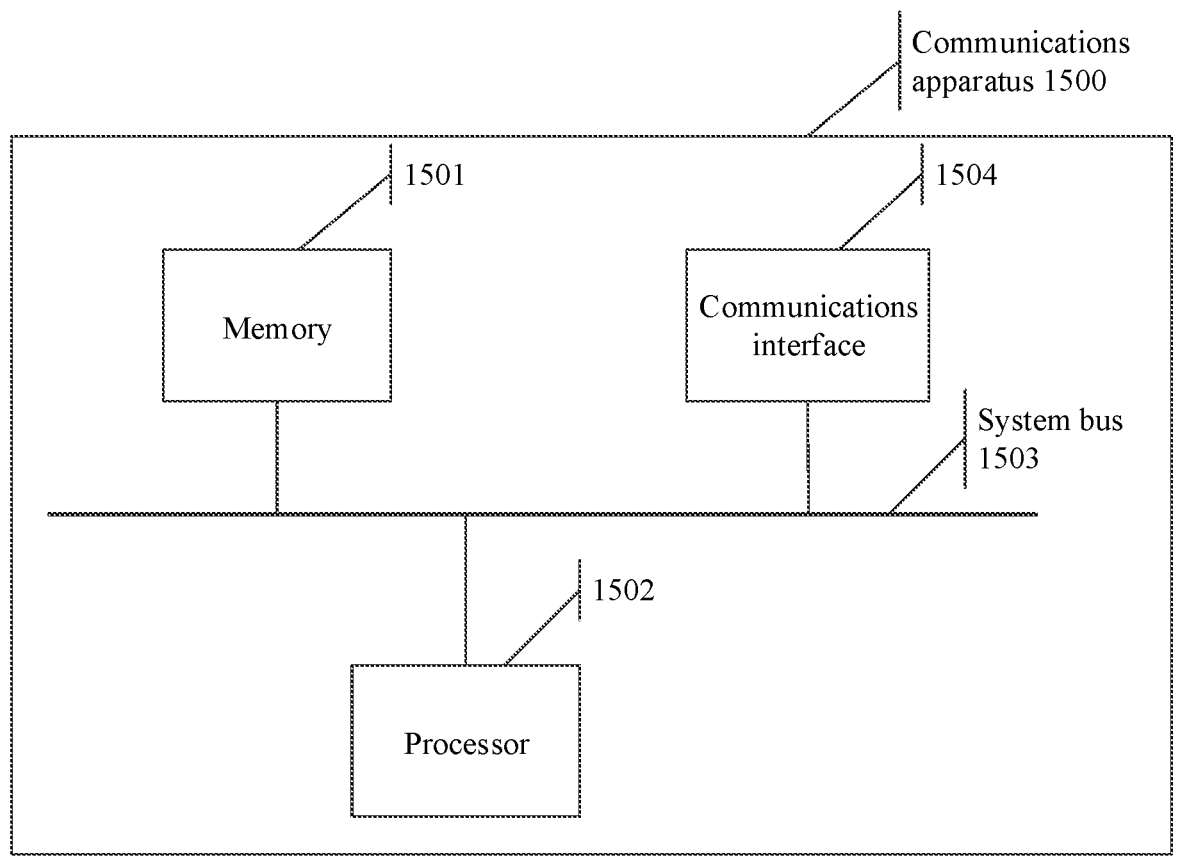

In one embodiment, a person skilled in the art can figure out that any one of the communications apparatus 800 to the communications apparatus 1400 may be implemented by using a structure shown in FIG. 15.

As shown in FIG. 15, a communications apparatus 1500 may include: a memory 1501, a processor 1502, a system bus 1503, and a communications interface 1504. The processor 1502, the memory 1501, and the communications interface 1504 are connected by using the system bus 1503. The memory 1501 is configured to store a computer-executable instruction. When the communications apparatus 1500 runs, the processor 1502 executes the computer-executable instruction stored in the memory 1501, so that the communications apparatus 1500 performs the method provided in any one of the embodiment shown in FIG. 3 to the embodiment shown in FIG. 7. For a specific method, refer to the foregoing descriptions and related descriptions in the accompanying drawings. Details are not described herein again. The communications interface 1504 may be a transceiver, or may be an independent receiver and transmitter.

In an example, the receiving unit 802 may correspond to the communications interface 1504 in FIG. 15. The processing unit 801 may be built in or independent of the memory 1501 of the communications apparatus 1500 in a hardware/software form.

In an example, the sending unit 902 may correspond to the communications interface 1504 in FIG. 15. The processing unit 901 may be built in or independent of the memory 1501 of the communications apparatus 1500 in a hardware/software form.

In an example, the receiving unit 1002 may correspond to the communications interface 1504 in FIG. 15. The processing unit 1001 may be built in or independent of the memory 1501 of the communications apparatus 1500 in a hardware/software form.

In an example, the receiving unit 1102 and the sending unit 1103 may correspond to the communications interface 1504 in FIG. 15. The processing unit 1101 may be built in or independent of the memory 1501 of the communications apparatus 1500 in a hardware/software form.

In an example, the sending unit 1202 may correspond to the communications interface 1504 in FIG. 15. The processing unit 1201 may be built in or independent of the memory 1501 of the communications apparatus 1500 in a hardware/software form.

In an example, the receiving unit 1302 may correspond to the communications interface 1504 in FIG. 15. The processing unit 1301 may be built in or independent of the memory 1501 of the communications apparatus 1500 in a hardware/software form.

In an example, the receiving unit 1402 and the sending unit 1401 may correspond to the communications interface 1504 in FIG. 15. The processing unit 1403 may be built in or independent of the memory 1501 of the communications apparatus 1500 in a hardware/software form.

In one embodiment, the communications apparatus 1500 may be a field-programmable gate array (FPGA), an application-specific integrated circuit (ASIC), a system on chip (SoC), or a central processing unit (CPU), a network processor (NP), a digital signal processor (DSP), or a micro controller unit (MCU), or a programmable logic device (PLD) or another integrated chip may be used. Alternatively, the communications apparatus 1500 may be an independent network element, for example, a network device or a terminal device.

Because the communications apparatus 800 to the communications apparatus 1400 provided in the embodiments described herein may be configured to perform the method provided in any one of the embodiment shown in FIG. 3 to the embodiment shown in FIG. 7, for technical effects that can be achieved by the communications apparatus 800 to the communications apparatus 1400, refer to the foregoing method embodiments. Details are not described herein again.

In the embodiments described herein, the terminal device can also perform measurement based on the downlink signal sent by the network device and/or the downlink signal sent by the another network device. In other words, the terminal device can still measure the source cell and the target cell. However, the network device may still send the handover command to the terminal device. If the terminal device receives the handover command sent by the network device, the terminal device performs cell handover by executing the handover command. As can be learned, the network device can control the terminal device, and does not lose control over the terminal device even if the terminal device completely determines whether to perform handover. In addition, if a target base station reserves a resource for the terminal device that is to perform handover, the network device may determine, after comprehensively considering various factors, whether to send the handover command to the terminal device, so that the terminal device can perform cell handover, thereby avoiding a waste of resource.

The embodiments are described with reference to the flowcharts and/or block diagrams of the method, the device (system), and the computer program product according to the embodiments described herein. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments described herein are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid-state drive (SSD)), or the like.

Obviously, a person skilled in the art can make various modifications and variations to the embodiments described herein without departing from the spirit and scope of this application. This application is intended to cover these modifications and variations provided that they fall within the scope of protection defined by the following claims and their equivalent technologies.

What is claimed is:

1. A method of cell handover, comprising:
receiving, by a terminal device, a first handover command from a network device, wherein the network device includes a base station, the first handover command indicates a handover condition, and the first handover command instructs the terminal device to determine whether to perform a first cell handover according to the handover condition;
obtaining, by the terminal device, a measurement result by measuring a downlink signal from the network device or a downlink signal from another network device,
sending, by the terminal device, the obtained measurement result to the network device, wherein the obtained measurement result enables the network device to determine whether the terminal device needs to perform a second cell handover;
determining, by the terminal device based on the obtained measurement result, whether the handover condition is satisfied;
in response to determining that the handover condition is satisfied, performing, by the terminal device, the first cell handover; and
before determining the handover condition is satisfied, in response to receiving, by the terminal device, a second handover command from the network device, performing, by the terminal device the second cell handover, wherein the second handover command instructs the terminal device to perform the second cell handover.

2. The method according to claim 1, further comprising:
receiving, by the terminal device, uplink configuration information from the network device; and
sending, by the terminal device, an uplink reference signal to the network device based on the uplink configuration information, wherein the uplink reference signal enables the network device to determine whether the terminal device needs to perform the second cell handover.

3. The method according to claim 1, wherein performing the first cell handover comprises:
perform the first cell handover without monitoring the second handover command from the network device.

4. The method according to claim 1, further comprising:
receiving, by the terminal device, an indication information from the network device, wherein the indication information indicates a release of the handover condition.

5. The method according to claim 1, wherein the first handover command indicates a target cell identity used for the first cell handover, and the second handover command indicates a target cell identity used for the second cell handover.

6. A method of cell handover, comprising:
sending, by a network device that includes a base station, a first handover command to a terminal device, wherein the first handover command indicates a handover condition, and the first handover command instructs the terminal device to determine whether to perform a first cell handover according to the handover condition, wherein the first handover command enables the terminal device to determine, based on a measurement result of a downlink signal from the network device or a downlink signal from another network device, whether the handover condition is satisfied, and enables the terminal device to, in response to determining the handover condition is satisfied, perform the first cell handover;
receiving, by the network device, the measurement result from the terminal device;
determining, by the network device based on the received measurement result, whether the terminal device needs to perform a second cell handover; and
in response to determining the terminal device needs to perform the second cell handover, sending, by the network device, a second handover command to the terminal device, wherein the second handover command instructs the terminal device to perform the second cell handover, wherein the second handover command enables the terminal device to, before determining the handover condition is satisfied, in response to receiving, by the terminal device, the second handover command from the network device, perform the second cell handover.

7. The method according to claim 6, further comprising:
sending, by the network device, uplink configuration information to the terminal device, wherein the uplink configuration information enables the terminal device to send an uplink reference signal to the network device;
receiving, by the network device, the uplink reference signal from the terminal device; and
obtaining, by the network device, a measurement result by measuring the uplink reference signal; wherein
determining whether the terminal device needs to perform the second cell handover comprises:
determining, by the network device, based on the obtained measurement result, whether the terminal device needs to perform the second cell handover.

8. The method according to claim 6, wherein the first handover command enabling the terminal device to perform the first cell handover comprises:
the first handover command enables the terminal device to perform the first cell handover without monitoring the second handover command from the network device.

9. The method according to claim 6, further comprising:
sending, by the network device, an indication information to the terminal device, wherein the indication information indicates a release of the handover condition.

10. The method according to claim 6, wherein the first handover command indicates a target cell identity used for the first cell handover, and the second handover command indicates a target cell identity used for the second cell handover.

11. A communications apparatus, comprising:
a non-transitory memory storage comprising instructions; and
one or more processors in communication with the memory storage, wherein the instructions, when executed by the one or more processors, cause the apparatus to:
receive a first handover command from a network device, wherein the network device includes a base station, the first handover command indicates a handover condition, and the first handover command instructs the apparatus to determine whether to perform a first cell handover according to the handover condition;
obtain a measurement result by measuring a downlink signal from the network device or a downlink signal from another network device;
send the obtained measurement result to the network device, wherein the obtained measurement result enables the network device to determine whether a terminal device needs to perform a second cell handover;
determine, based on the obtained measurement result, whether the handover condition is satisfied;
in response to determining that the handover condition is satisfied, perform the first cell handover; and
before determining the handover condition is satisfied, in response to receiving a second handover command from the network device, perform the second cell handover, wherein the second handover command instructs the terminal device to perform the second cell handover.

12. The apparatus according to claim 11, wherein the instructions, when executed by the one or more processors, further cause the apparatus to:
receive uplink configuration information from the network device; and
send an uplink reference signal to the network device based on the uplink configuration information, wherein the uplink reference signal enables the network device to determine whether the communications apparatus needs to perform the second cell handover.

13. The apparatus according to claim 11, wherein to perform the first cell handover, the instructions, when executed by the one or more processors, cause the apparatus to:
perform the first cell handover without monitoring the second handover command from the network device.

14. The apparatus according to claim 11, wherein the instructions, when executed by the one or more processors, further cause the apparatus to:
receive an indication information from the network device, wherein the indication information indicates a release of the handover condition.

15. The apparatus according to claim 11, wherein the first handover command indicates a target cell identity used for the first cell handover, and the second handover command indicates a target cell identity used for the second cell handover.

16. A communications apparatus, comprising:
a non-transitory memory storage comprising instructions; and one or more processors in communication with the memory storage, wherein the instructions, when executed by the one or more processors, cause the communications apparatus to:

send a first handover command to a terminal device, wherein the first handover command indicates a handover condition, and the first handover command instructs the terminal device to determine whether to perform a first cell handover according to the handover condition, wherein the first handover command enables the terminal device to determine, based on a measurement result of a downlink signal from the communications apparatus or a downlink signal from another communications apparatus, whether the handover condition is satisfied, and enables the terminal device to, in response to determining the handover condition is satisfied, perform the first cell handover;

receive the measurement result from the terminal device;

determine, based on the received measurement result, whether the terminal device needs to perform a second cell handover; and in response to determining the terminal device needs to perform the second cell handover, send a second handover command to the terminal device, wherein the second handover command enables the terminal device to, before determining the handover condition is satisfied, in response to receiving, by the terminal device, the second handover command from the apparatus, perform the second cell handover, wherein the second handover command instructs the terminal device to perform the second cell handover.

17. The apparatus according to claim 16, wherein the instructions, when executed by the one or more processors, further cause the apparatus to:

send uplink configuration information to the terminal device, wherein the uplink configuration information enables the terminal device to send an uplink reference signal to the communications apparatus;

receive the uplink reference signal from the terminal device; and obtain a measurement result by measuring the uplink reference signal; wherein to determine whether the terminal device needs to perform the second cell handover, the instructions, when executed by the one or more processors, cause the apparatus to:

determine whether the terminal device needs to perform the second cell handover based on the obtained measurement result.

18. The apparatus according to claim 16, wherein the first handover command enabling the terminal device to perform the first cell handover comprises:

the handover condition allows the terminal device to perform the first cell handover without monitoring the second handover command from the communications apparatus.

19. The apparatus according to claim 16, wherein the instructions, when executed by the one or more processors, further cause the apparatus to:

send an indication information to the terminal device, wherein the indication information indicates a release of the handover condition.

20. The apparatus according to claim 16, wherein the first handover command indicates a target cell identity used for the first cell handover, and the second handover command indicates a target cell identity used for the second cell handover.

* * * * *